United States Patent [19]
Hashizume et al.

[11] Patent Number: 5,860,075
[45] Date of Patent: Jan. 12, 1999

[54] DOCUMENT DATA FILING APPARATUS FOR GENERATING VISUAL ATTRIBUTE VALUES OF DOCUMENT DATA TO BE FILED

[75] Inventors: Tatsuo Hashizume, Moriguchi; Kiyoshi Kanazawa, Katano; Hiroyuki Sasaki, Ibaraki; Hideo Terai, Kyoto; Masaaki Kobayashi, Kadoma, all of Japan

[73] Assignee: Matsushita Electric Industrial Co., Ltd., Osaka, Japan

[21] Appl. No.: 544,825

[22] Filed: Oct. 18, 1995

Related U.S. Application Data

[63] Continuation-in-part of Ser. No. 268,269, Jun. 29, 1994, abandoned.

[30] Foreign Application Priority Data

Jun. 30, 1993 [JP] Japan .................................... 5-162614

[51] Int. Cl.⁶ .................................................. G06F 17/30
[52] U.S. Cl. ..................... 707/530; 382/306; 382/286; 382/190; 707/6
[58] Field of Search ................................. 395/793, 794, 395/796, 779, 791; 382/305, 306, 180, 209, 190, 185, 229, 317, 286, 291, 176; 707/530–531, 532, 534, 517, 529, 6

[56] References Cited

U.S. PATENT DOCUMENTS

| | | | |
|---|---|---|---|
| 4,358,824 | 11/1982 | Glickman et al. | 395/605 |
| 4,947,370 | 8/1990 | Sugitani | 345/124 |
| 5,021,989 | 6/1991 | Fujisawa et al. | 395/350 |
| 5,182,709 | 1/1993 | Makus | 395/759 |
| 5,185,821 | 2/1993 | Yoda | 382/306 |
| 5,253,307 | 10/1993 | Wayner et al. | 382/181 |
| 5,353,397 | 10/1994 | Yokoyama et al. | 395/763 |
| 5,369,742 | 11/1994 | Kurosu et al. | 395/784 |
| 5,404,435 | 4/1995 | Rosenbaum | 395/777 |

Primary Examiner—Joseph H. Feild
Attorney, Agent, or Firm—Price Gess & Ubell

[57] ABSTRACT

A document data filing apparatus automatically selects attribute values indicating visual features of a desired document from the code data of document data inputted. The attribute value generation unit generates attribute values indicating visual features of the document data inputted as coded data from the document data input unit. At this point, the presence or absence of dot data and specific words and characters are judged. The document data storage unit stores the document data in association with its attribute for retrieval. The attribute value designation unit makes an operator designate the attribute value as retrieval key to the document data to be retrieved The readout unit reads the document data corresponding to the designated attribute value from the document data storage unit. The display unit displays the document data. The retrieving technique is applied to a word processor.

12 Claims, 30 Drawing Sheets

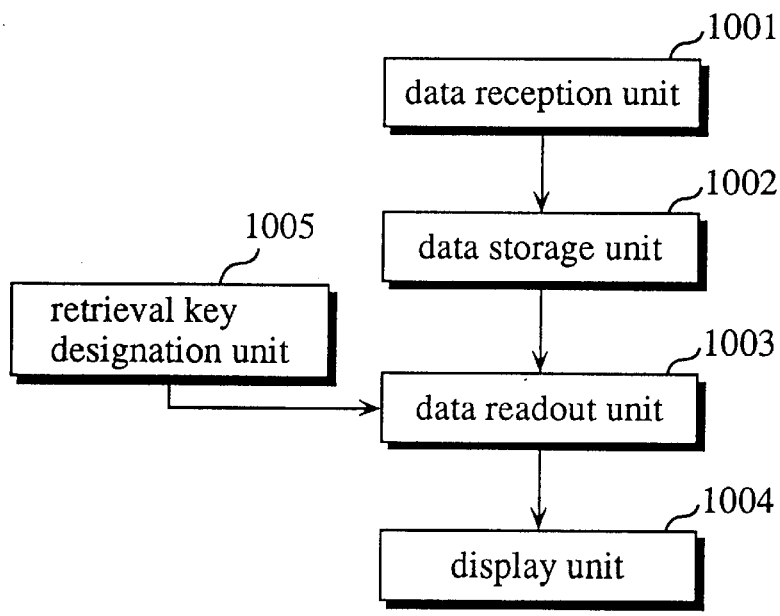

| titles of document data | retrieval keys | storage locations |
|---|---|---|
| document filing apparatus | created on April 10, '93 drawing,patent,invention H,N,MS electric appliance program,automatic retrieval | addresses 01~17 on disk 001 |
| document creation apparatus | created on Feb. 15, '93 drawing,patent,invention K,N,MS electric appliance program,print,image | addresses 18~36 on disk 001 |
| BS broadcast keys | created on Feb.1, '93 no drawing,company document | addresses 37~45 on disk 001 |

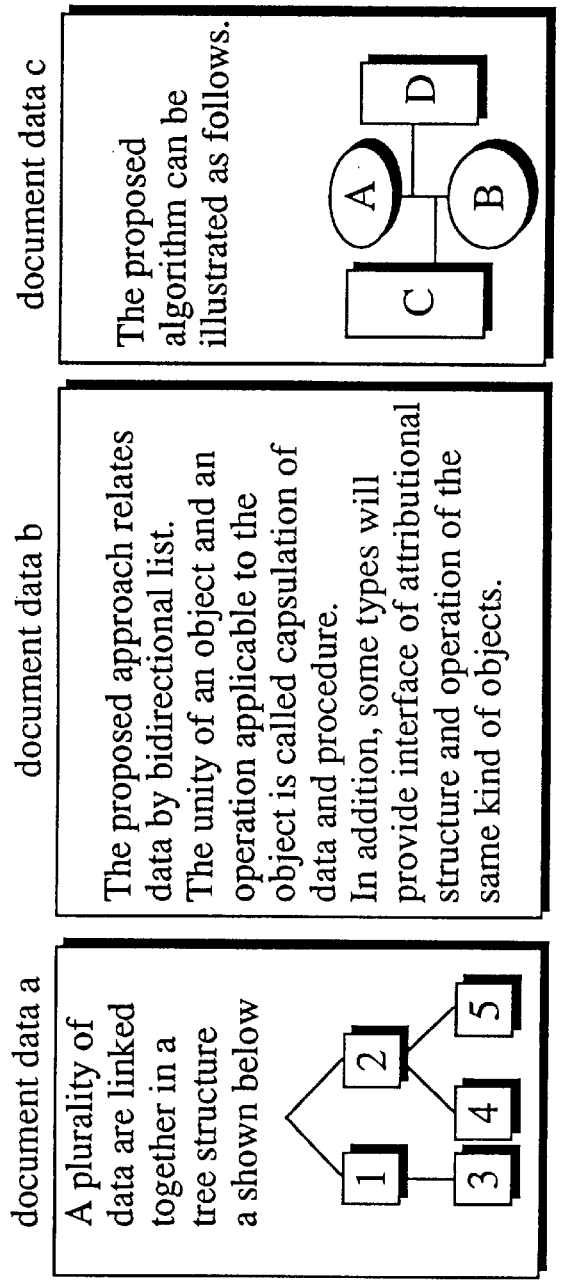

FIG. 6

| title of document data | attribute values for retrieval | | | | | storage locations |
|---|---|---|---|---|---|---|
| | characters | character modifiers | non-character | line drawing | image | |
| document data filing apparatus | 1 | 1 | 1 | 1 | 0 | addresses 01~17 on disk 001 |
| document data a | 1 | 1 | 1 | 1 | 0 | addresses 18~21 on disk 001 |
| document data b | 1 | 0 | 0 | 0 | 0 | addresses 22~25 on disk 001 |
| document data c | 1 | 1 | 1 | 1 | 0 | addresses 26~28 on disk 001 |
| retrieving system | 1 | 0 | 0 | 0 | 0 | addresses 29 on disk 001 ~03 on disk 002 |

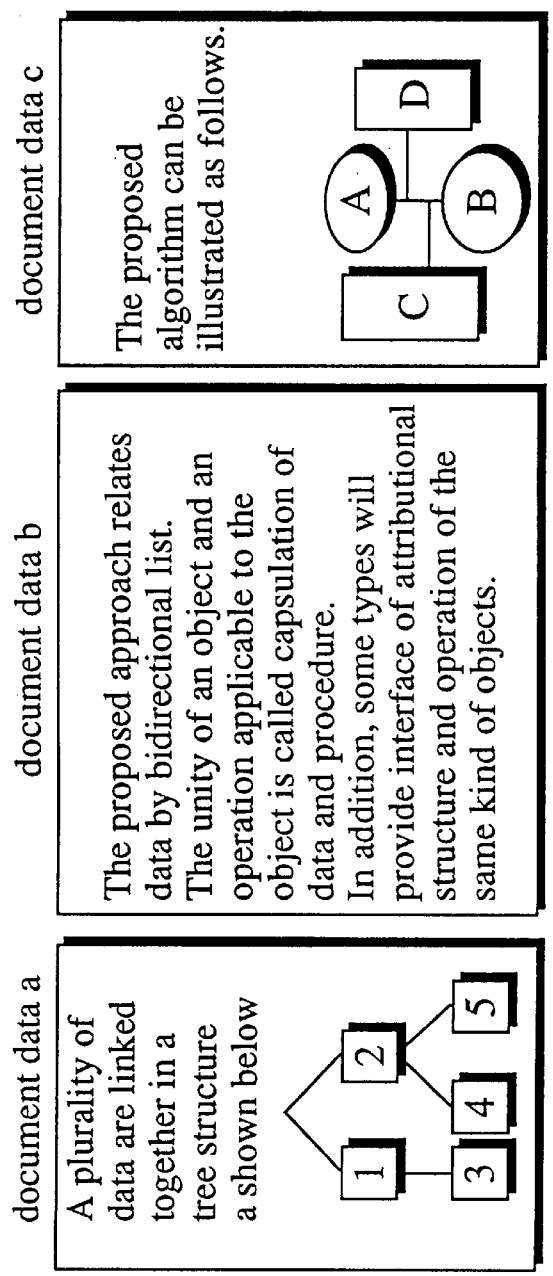

FIG. 7C
document data a
A plurality of
data are linked
together in a
tree structure
a shown below
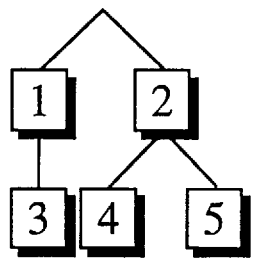
document data b
The proposed
algorithm can be
illustrated as follows.
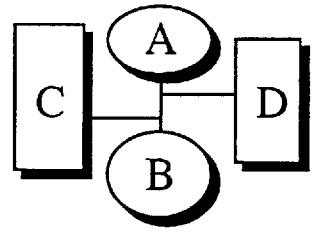

FIG. 11B

| title of document data | | characters | character modifiers | attribute value for retrieval non-character | line drawing | image | storage locations |
|---|---|---|---|---|---|---|---|
| document data filing apparatus | 1 | 1 | 1 | 0 | 0 | 0 | addresses 01~05 on disk 001 |
| | 2 | 1 | 1 | 0 | 0 | 0 | addresses 06~10 on disk 001 |
| | 3 | 1 | 0 | 1 | 1 | 0 | addresses 11~14 on disk 001 |
| | 4 | 1 | 0 | 0 | 0 | 0 | addresses 15~17 on disk 001 |
| | TOtal | 1 | 1 | 1 | 1 | 0 | addresses 01~17 on disk 001 |

FIG. 13A

| title of document data | pages | attribute value for retrieval | | | | image data storage places | storage locations |
|---|---|---|---|---|---|---|---|
| | | characters | character modifiers | non-character | line drawing | image | | |
| document data filing apparatus | 1 | 1 | 1 | 0 | 0 | 0 | — | addresses 02~06 on disk 001 |
| | 2 | 1 | 1 | 0 | 0 | 0 | — | addresses 07~11 on disk 001 |
| | 3 | 1 | 0 | 1 | 1 | 0 | addresses 01 on disk 001 | addresses 12~15 on disk 001 |
| | 4 | 1 | 0 | 0 | 0 | 0 | — | addresses 16~18 on disk 001 |
| | TOtal | 1 | 1 | 1 | 1 | 0 | page 3 | addresses 01~18 on disk 001 |
| document data a | 1 | 1 | 1 | 1 | 1 | 0 | addresses 19 on disk 001 | addresses 20~23 on disk 001 |
| document data b | 1 | 1 | 0 | 0 | 0 | 0 | — | addresses 24~27 on disk 001 |
| document data c | 1 | 1 | 1 | 1 | 1 | 0 | addresses 28 on disk 001 | addresses 29~31 on disk 001 |

FIG. 16

| i | character codes | j | data for judging attributes (languages, words, etc.) |
|---|---|---|---|
| 1 | kana characters | 1 | Japanese |
| 2 | kanji (chinese characters) | 1 | Japanese |
| | | 2 | (Japanese for school children) |
| | | 3 | Japanese(old) |
| | | 4 | Chinese |
| | | 5 | Korea |
| | | ... | ... |
| 4 | Hangul | 1 | Korea |
| 5 | alphabet | 1 | English 「I」, ... |
| | | 2 | French 「La」, ... |
| | | 3 | German 「ue」, 「Ich」, ... |
| | ... | ... | .... |
| 6 | German | 1 | German 「ü」, ... |
| 7 | Russian | 1 | Russian |
| ... | ... | ... | ... |
| 11 | Arabic | 1 | Arabic |

Fig. 21A
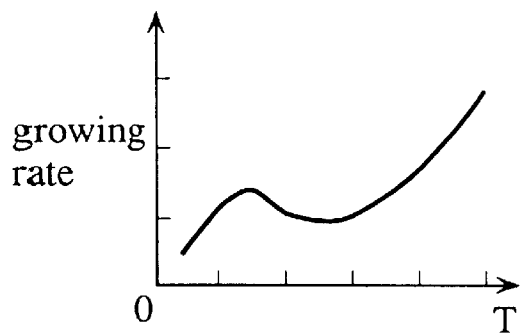
Fig. 21B
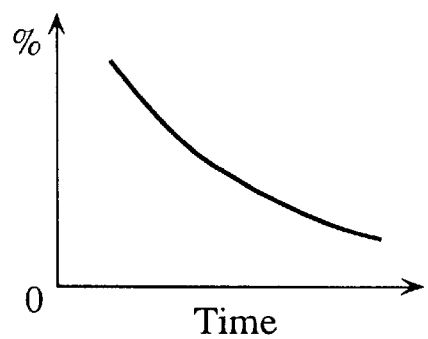
Fig. 21C
| U.S.A | $600 \times 10^{12}\$$ |
|---|---|
| J P N | $300 \times 10\$$ |
Fig. 21D
| U.S.A | 240 mill |
|---|---|
| J P N | 120 |
| E N G. | 60 |
Fig. 21E
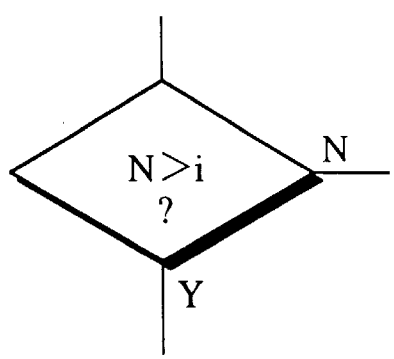
Fig. 21F
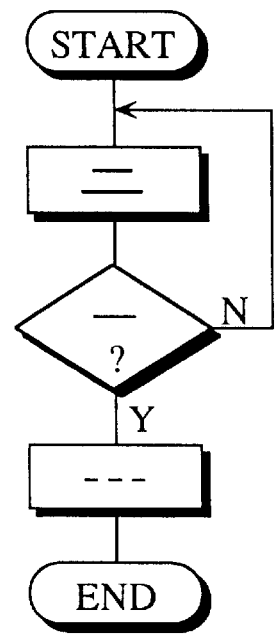
Fig. 21G
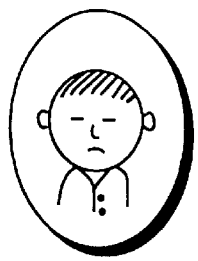

DOCUMENT DATA FILING APPARATUS FOR GENERATING VISUAL ATTRIBUTE VALUES OF DOCUMENT DATA TO BE FILED

This application is a continuation-in-part application of U.S. Ser. No. 08/268,269, filed on Jun. 29, 1994, for A DOCUMENT DATA FILING APPARATUS FOR PROVIDING ATTRIBUTE VALUES TO DOCUMENT DATA TO BE FILED, abandoned.

(1) FIELD OF THE INVENTION

The present invention relates to an apparatus for filing document data and especially to an apparatus for generating visual attribute values to retrieve desired data from a large amount of document data stored in a computer system

(2) RELATED ARTS

Apparatuses which store a large amount of electronified document data and consecutively di splay them for users to refer to desired document data have been widely used these days.

Such document data filing apparatuses are provided with functions of receiving, reading, and displaying document data in a high speed, thereby allowing users to retrieve desired document date quickly.

Generally, such apparatuses store a large amount of document data. In addition, more and more documents on similar or same techniques have come to be published, so that data retrieval by using only keywords are often insufficient.

Therefore, a technique of narrowing down candidate data by using relevant keywords has been developed; however, this technique still have various drawbacks.

Therefore, some retrieval requirements such as keywords or file creation dates are given as retrieval keys in order to prevent users from referring to every one of the large number of documents stored in such apparatuses. As a result, document data which satisfy the retrieval requirements or the titles of these document data can be exclusively displayed.

FIG. 1A shows the construction of a conventional document data filing apparatus including the following units:

A data reception unit 1001 receives document data to be stored through a user's input operation.

A data storage unit 1002 stores document data inputted to the data reception unit 1001. The data storage unit 1002 is composed of a high speed semi-conductor memory for retrieving desired document data and a storage disk for storing document data themselves.

FIG. 1B shows a table stored in the high-speed semiconductor memory. The table includes the title and retrieval keys of each document data, and the storing location of each document data in the storage disk. The document data themselves are stored in the storage disk in the order they have been inputted because the amount of required storage resources are very large. This construction of the data storage unit 1002 realizes storage of large amount of data and comparatively high-speed retrieval of desired data.

A data readout unit 1003 reads out the title of desired document data or the desired document data itself among all the data stored in the data storage unit 1002, using a retrieval key.

A display unit 1004 displays document data read out by the data readout unit 1003.

A retrieval key designation unit 1005 receives retrieval requirements such as keywords or file creation dates, as retrieval keys.

Although the conventional document data filing apparatus is also provided with basic components such as an operation disk and a printer unit, they are not described here because of no relevance to the present invention.

In addition, these functions of locating desired data using a retrieval key, of displaying document data sequentially just like turning over each page of a book, and of enlarging or diminishing the size of data to be displayed are all well known, so that they are not described here.

The following is an operational description of this conventional document data filing apparatus.

It is assumed that the data reception unit 1001 receives three different document data "a", "b", and "c" shown in FIG. 2A. The document data "a" and "c" are composed of both character data and image data, and the other document data "b" is composed of character data only.

The data storage unit 1002 stores each of these document data "a", "b", and "c" inputted to the data reception unit 1001 as electro-magnetic information.

The data readout unit 1003 reads out these three document data without any change unless a special retrieval requirement is designated.

The data display unit 1004 displays every document data indicated by a circle in the table of FIG. 2B either in the order they have been inputted or all at once. In this case, all the document data "a", "b", and "c" are displayed.

When a desired data is retrieved from among a large number of data, some images and special characters are often used as retrieval keys because of the easiness of their visual recognition and the uniqueness of their appearances. For example, the drawing in the abstract of a patent application is often used as a retrieval key for retrieving a desired patent application from among a large number of patent applications. Furthermore, titles or important items can be the retrieval keys because they are often written in capital letters or underlined. Many foreign documents are important. Various colors and gradation can also be the retrieval keys. As a result, the demand for exclusively retrieving data which contains drawings or unique characters has been growing. There is such a demand especially when a retriever who once referred to certain data has no effective keyword to retrieve the data. For example, those who have been dealt in techniques of a certain field at laboratories or patent offices tend to use limited keywords, and as a result, a large amount of data may be selected by the same keyword.

In addition, people often want to retrieve document data informed by other people at a conference or the like; however, the informers seldom remember the title of the document data, and only have a visual impression. Thus, there is a growing demand for retrieving document data from its visual features.

As an example, according to Japanese Laid-open Patent Application No. 61-193265, document data containing drawings are exclusively displayed in accordance with a user's designation of the storing place of drawings as a retrieval requirement. As a result, only the document data "a" and "c" with circles are displayed as shown In the second column of the table. In contrast, the document data "b" is displayed as data containing no drawings.

However, according to the conventional data retrieving methods, the operation of selecting a retrieval requirement as a retrieval key both for data storage and data retrieval is not only troublesome but time consuming when the data must be retrieved from among a large amount of data. This problem happens, for example, when desired data is selected from among patent-related data to be stored in a large company or from documents and drawings related to construction of buildings to be stored in a construction firm. This is because drawing data require retrieval keys appropriate for them such as creation dates and also require an additional process for storing and registering these retrieval keys in association with corresponding data.

With respect to documents written in foreign languages, the creation of keywords is often difficult.

A technique of excluding frequently-used words such as "the" and "and" from inputted document data and generating keywords from a specific type of words has been developed. However, in order to generate keywords automatically or to weight the similarity of the keywords, it is necessary to have a dictionary in which a large number of words for keywords is registered and the words are classified. This leads to the complication of the system. Furthermore, the producers of such an apparatus would be under limitations in view of copy rights or linguistic knowledge to equip keyword dictionaries of languages which belong to different language families from the producers' mother tongue.

In addition, in the case of documents written in old English, which ordinary people have hard time in understanding, the creation of keywords is sometimes difficult.

Retrievers do not make effective use of visual information memorized in their minds.

Notebook computers, which have been widely used, have small display screens because of their portability. This makes it inconvenient to retrieve data with these small display screens; however, no appropriate measures are taken into consideration to solve the inconvenience.

In offices, on the other hand, word processors or TV sets with a large display screen are often left unused; however, the effective use of such a large display screen is not being considered.

If data to be retrieved include visual features such as graphs, the way of displaying them can be different from that of written documents; however, this is not taken into consideration.

In addition, no consideration is taken into account to retrieve a desired document for reference while another document is being formed on a word processor.

Furthermore, retrieved data cannot be fully amended or referred to.

SUMMARY OF THE INVENTION

In view of the foregoing expectations, an object of the present invention is to provide an inexpensive document data filing apparatus which automatically classifies a large amount of document data that contain image data or a foreign language, or are written in a foreign language, based on their attributes such as their visual features, thereby allowing users to easily retrieve desired document data by using the attributes as retrieval keys.

Another object of the present invention is to provide a document data filing apparatus which makes users use any visual feature of desired document data when the users, who used the document data before, have a vague memory of it.

Another object of the present invention is to provide a document data filing apparatus which classifies document data that are newly produced or stored, to make it possible to retrieve the document data later, based on its visual features.

Another object of the present invention is to provide a document data filing apparatus which classifies document data that are newly produced or stored, to make it possible to retrieve the document data later, based on its visual features.

Another object of the present invention is to provide a document data filing apparatus which automatically outputs visual attribute values, which function as retrieval keys.

Another object of the present invention is to provide a document data filing apparatus which realizes quick retrieval from portable computers having a small display screen.

Another object of the present invention is to provide a document data filing apparatus which makes effective use of the display screens of word processors or the like which are not currently used.

Another object of the present invention is to provide a document data filing apparatus which makes users retrieve desired data, leaving the document running on the display screen as it is.

Another object of the present invention is to provide a document data filing apparatus which makes retrieved data be quickly called to process them.

These objects can be achieved by a document filing apparatus comprising the following units: a document data reception unit for receiving document data including code data and layout control data; a data division unit for extracting the code data and the layout control data from received document data;
a coda data attribute value dictionary for previously registering at least one of following attribute values: Chinese characters, Chinese characters mainly used in Chinese language, Chinese characters used only in Chinese language, Japanese hiragana characters, Japanese katakana characters, alphabet, German characters, Russian characters, Greek characters, Arabic numerals, hangul, Arabic characters, Italics, enlarged characters, vertically enlarged characters, horizontally enlarged characters, hatched characters, reversed characters, superscripts, subscripts, characters written in bold, characters written in capital letters, characters with one dot above or to their right, end underlined characters; a layout code data attribute value dictionary for previously registering at least one of following attribute values: a size of pages, number of pages, whether characters are written vertically or horizontally, one of whether each page is divided into right and left columns, number of lines per page, and number of characters per line in a case where characters are written horizontally, one of number of columns per page, number of characters per column, end number of rows per column in a case where characters are written vertically, number of characters per line or per column in a language which does not have space between words, average number of words per line or per column in a language which has space between words, a presence or absence of arrows, a presence or absence or drawings, a presence or absence of graphs, a presence or absence of tables, a presence or absence of flowcharts, a presence or absence of structure illustrations, number of drawings, a position of drawings, size of drawings, and number of pages which include drawings, and colors; an attribute value generation unit for generating attribute values indicating visual features of desired document data by referring to the code data attribute value dictionary, based on the code data extracted by the data division unit and by further referring to the code data and layout control data and the layout code data attribute value dictionary; a document data storage unit for storing document data in association with the attribute values indicating visual features of desired document data as retrieval keys; an attribute value designation unit for making an operator designate an attribute value as a retrieval key; a readout unit for reading one of document data which correspond to the attribute value designated by the attribute value designation unit and part of the document data containing the visual features; a display unit for displaying candidate document data page by page, the candidate document data having been read by the readout unit for the operator to locate desired document data, based on visual features remaining in the operator's mind; and a selecting unit for selecting document data to be retrieved from among the candidate document data according to the operator's direction.

The document data filing apparatus may further include the following units: a content attribute value dictionary for previously registering 20 or less words for each attribute value, the words being frequently used and featuring received document data in association with languages, ages, fields of the words, a presence or absence of a sentence written in another language letters; a word extract unit for, when the attribute value generation unit has outputted the attribute value of a character contained in the document data received by the document data reception unit, extracting words from the code data received; and the attribute value generation unit including a document data content attribute value generation unit for checking whether the words extracted by the word extract unit are already registered by the content attribute value dictionary, and if they are registered, outputting an attribute value indicating contents of the document data.

The document data reception unit may include an input operation reception unit for receiving operator's input operation to generate document data.

The data document filing apparatus may further comprise the following units: a data display control unit for making the display unit display document data in replace of the candidate document data, the document data are being received by the input operation reception unit; a multi-window control unit for generating an extra display window in addition to a display window for current document data displayed on the display unit, and displaying one of the candidate document data read by the readout unit and the part of the document data containing any visual feature on the extra display window of an external apparatus; a data conversion/connection unit for converting necessary signal forms and connecting signal lines to make one of a plurality of windows which are to be displayed under control of the multi-window control unit be displayed on the extra display window of the external apparatus; and an extra display window control unit for making the selecting unit select document data to be retrieved from among the candidate document data displayed on the extra display window according to the operator's direction and making selected document data be displayed on the extra display window.

The attribute value generation unit comprises the following units: an input data attribute value generation unit for making the attribute value generation unit generate attribute values for document data received by the input operation reception unit; and an attribute value extract unit for extracting an appropriate attribute value indicating visual features of the received document data through the operator's direction and outputting an extracted attribute value.

The document data storage unit may comprise the following units; a storage media placement unit for storing the received document data in storage media which are detachable from the document filing apparatus; and a storage media data storage unit for storing first information to designate a storage medium having desired document data and second information to identify each storage medium, in association with an attribute value indicating visual features of each document data outputted under direction of the input data attribute value generation unit and the attribute value extract unit.

The attribute value designation unit may comprise the following units: a storage media attribute value designation unit for making an operator designate an attribute value as a retrieval key, the attribute value being stored in the storage media data storage unit.

The readout unit may comprise a storage media readout unit for reading one of a storage medium which has document data corresponding to the attribute value designated by the storage media attribute value designation unit and the second information from the storage media data storage unit.

These objects can be also achieved by a document filing apparatus comprising the following units: a document data reception unit for receiving document data in a form of dot data; a pixel line/belt detection unit for detecting black pixels or white pixels in a form of a line or a belt from received document date; a character string/drawing extract unit for extracting lines and rows of character string data and drawings from horizontal and vertical arrangement of the black pixels or white pixels detected by the pixel line/belt detection unit; an average-size character extract unit for extracting average-size characters from spaces between the characters and one of the lines of the character string data and the rows of character string data extracted by the character string/drawing extract unit; a drawing attribute value dictionary for previously registering at least one of following attribute values; a size of pages, shape of the pages, whether characters are written vertically or horizontally, number of columns, number of characters per column, and number of rows per page in a case where characters are written vertically, whether each page is divided into right and left columns, number of lines per page and number of characters per line in a case where characters are written horizontally, whether a document is printed or generated with a word processor or typewriter, a presence or absence of characters larger than the average-size characters, a presence or absence of characters smaller than the average-size characters, a presence or absence of drawings, a presence or absence of graphs, a presence or absence of tables, a presence or absence of flowcharts, a presence or absence of structural illustration, a presence or absence of oval portraits, number of drawings, size of drawings, position of drawings, and a presence of absence of colors, a visual feature attribute value dictionary for previously registering at least one of following attribute values: number of columns per page in a case where characters are written vertically, number of characters per column and number of rows per page in a case where characters are written vertically, whether each page is divided into right and left columns in a case where characters are written horizontally, average number of characters per line and average number of lines per page in a case where characters are written horizontally, and number of pages of a document, a document data type dictionary for previously registering a type of each document data as an attribute value, the type being determined by visual features including drawings and document styles; an attribute value generation unit for generating attribute values indicating visual features of document data, by comparing the dot data received by the document data reception unit with the drawing attribute value dictionary, the visual feature attribute value dictionary, and the document data type dictionary; a document data storage unit for receiving the attribute value from the attribute value generation unit and storing each document data in association with a corresponding one of the attribute values as a retrieval key; an attribute value designation unit for making an operator designate an attribute value indicating visual features of document data to be retrieved as a retrieval key; a readout unit for reading the document data corresponding to the attribute value designated by the attribute value designation unit; a display unit for sequentially displaying document data read by the readout unit, based on the operator's memory of visual features of the document data; and a selecting unit for selecting document data to be retrieved from among candidate document data displayed by the display unit according to the operator's direction.

The attribute value generation unit may comprise the following units: a few-stroke character detection unit for detecting a presence or absence of a character with few strokes from the average-size characters extracted by the average-size character extract unit; and a character type generation unit for determining a type of a few-stroke character detected by the few-stroke character detection unit and for outputting the type as an attribute value of the document data.

The document data filing apparatus may further comprise a content attribute value dictionary unit for registering 20 or less words consisting of few-stroke characters and being frequently used in association with data to be used for judging attribute values, the words indicating at least one of a language, age, and field of the document data.

The attribute value generation unit may comprise the following units: a word extract unit for extracting a word consisting of few-stroke characters from few-stroke characters detected by the few-stroke character detection unit; an input data attribute value generation unit for checking whether the word extracted by the word extract unit is already registered in the content attribute value dictionary unit, and if the word is registered, outputting an attribute value which indicates the document data, based on the data to be used for judging attribute values registered in association with the word.

The objects can be also achieved by a document filing apparatus comprising the following units: a layout reception unit for receiving an operator's input operation for specifying at least one of following attribute values: a size of pages, whether characters are written vertically or horizontally, number of rows per page in a case where characters are written vertically, number of characters per page in a case where characters are written vertically, number of lines per page in a case where characters are written horizontally, number of characters per page in a case where characters are written horizontally, a type of characters, and a typeface of characters, a layout attribute value output unit for extracting attribute values indicating layout of characters, based on the operator's operations received by the layout reception unit and outputting extracted attribute values; a document generation operation reception unit for receiving at least one of following operations from the operator: a document generation start signal, a storage medium identifier for identifying a storage medium which stores a document to be retrieved, characters which compose a title of the document to be retrieved, character modifier, character size, drawings included in the document, space between words, starting a new line or page, colors, and a document generation completion signal, an attribute value database for previously registering one of a program and data to generate attribute values of graphic features of the document data, based on the operations received by the document generation operation reception means; a graphic feature attribute value output unit for, in response to the operator's input operation, outputting at least one of following attribute values by referring to the attribute value database: number of pages of an entire document, average number of words per line in a case where a signal indicating a space between words is inputted, a presence or absence of drawings, a presence or absence of graphs, a presence or absence of tables, a presence or absence of flowcharts, a presence or absence of structure illustrations, position of drawings on a page, number of pages which include drawings, and number of drawings, an attribute value storage unit for storing attribute values outputted from the layout attribute value output unit and the graphic feature attribute value output unit in association with at least one of a title of the document, a position of the document data in the storage medium, and the storage medium identifier received by the document generation operation reception means, an attribute value designation unit for making an operator designate the attribute value of the document to be retrieved as a retrieval key; a readout unit for retrieving document data corresponding to the attribute value designated by the attribute value designation unit by referring to the attribute value storage unit and for outputting at least one of the title of the document, the position of the document data in the storage medium, and the storage medium identifier; a display-use readout unit for reading out at least one of titles of candidate documents, documents, and parts of documents having visual features from the attribute value storage unit and the storage media; a display unit for displaying candidate document data read by the readout unit page by page; and a selecting unit for selecting document data to be retrieved from among candidate document data displayed by the display unit according to the operator's direction.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2A shows three document data to be inputted. FIG. 2B is a table showing requirements for each document data to be displayed.

FIG. 6 is a table showing data stored in memory of data storage unit, the data including titles, attribute values, and storage locations of document data.

FIG. 7A shows three document data to be inputted. FIG. 7B shows the presence or absence of line drawing data as an attribute value for each of the three document data. FIG. 7C shows the contents of document data to be displayed when document data containing line drawing data are designated.

FIG. 13A is a table showing data stored in memory of data storage unit for the purpose of data retrieval.

FIG. 16 is a table showing code data stored in the attribute value generation unit according to the fourth embodiment.

FIG. 19A shows data to be retrieved written in Chinese language. FIGS 19B–C show data to be retrieved written in Japanese language.

FIGS. 21A–G show the drawing feature database.

DESCRIPTION OF THE PREFERRED EMBODIMENTS

<Embodiment 1>

Figure 3A:
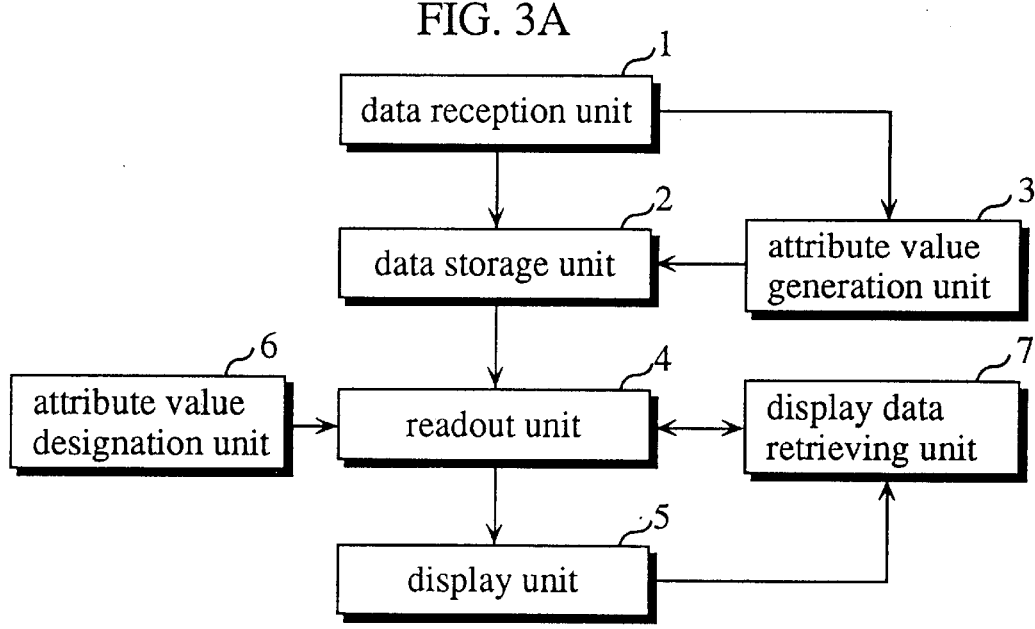
FIG. 3A shows the construction of the document data filing apparatus according to the first embodiment of the present invention.

As shown in FIG. 3A, the document data filing apparatus of this embodiment is composed of the following units.

A data reception unit 1 receives document data created by a word processor or the like in the form of code data. The code data can be character code date representing text data, line drawing code data, or dot code data representing image data depicted in dot patterns. The data reception unit 1 also receives control data such as an end-of line signal and an end-of-page signal.

The character code data can be Chinese characters to be used in the Japanese writing system, Chinese characters (hereinafter Kanji) to be used in the Chinese writing system, Japanese Hiragana alphabet, Japanese Katakana alphabet, Roman letters, Russian letters, German letters, Greek letters, Arabian numerals, Korean letters, arithmetic symbols such as "=", and those characters applied a modifying process such as hatching or enlargement.

The line drawing data can be straight lines identified by the coordinate of their both ends, rectangles identified by their diagonal points, circles identified by the coordinate of their centers and radiuses, arrows, diacritical marks, etc. These lines further can be a full line, a dotted line, or a short dashed line. Straight lines, rectangles, circles and arrows are taken notice of because they are often related to important descriptions, tables, flowcharts, and that they tend to remain producers' minds and be retrieved.

Dotted lines and short dashed lines are taken notice of because they are often related to important descriptions or systematized diagrams, and that they tend to remain producers' minds and be retrieved. When these lines are in the same direction as a character string and close to the character string, they are probably used to indicate the presence of important description, and otherwise they are probably contained in systematized diagrams.

Diacritical marks are taken notice of because they are often related to important descriptions.

The use of different colors, and colored tables or characters are regarded as line drawing data.

The image data can be a black and white bit map data, and the like. The contents themselves of these codes defined by ISO, JIS, ASCII, etc. are well known so that they are not described in detail here.

When the disk in which document data are stored and the document data filing apparatus use different codes from each other, either one of the codes can be converted into the other. This technique is well known and its explanation is omitted.

The explanation of expression control signals such as signals which indicate to start a new line or a new page, and to make a pause between two words is omitted.

A data storage unit 2 stores document data inputted to the data reception unit 1. The data storage unit 2 is composed of a hard disk 201 capable of storing a large number of document data and a high speed semi-conductor memory 202 for retrieving document data, the hard disk being an optical disk, an optical-magnetic disk, a magnetic disk, or the like.

An attribute value generation unit 3 automatically generates the attribute value related to visual features of document data inputted to the data reception unit 1 from the code data of the document data. The automatic generation of an attribute value is performed by electro-magnetically collating the inputted code data with a predetermined dictionary or template such as a JIS code. In other words, bit values constituting character code data are compared to each other and the lengths and directions of lines in the character code data are recognized. Since the collation is a well known technique, it is not further described. The recognition of the lengths and directions of the lines is done by calculating the distance between both ends of each line in horizontal or vertical directions.

A data readout unit 4, which is composed of a micro computer 41 and a storage unit 42 for storing document data which have been read out, reads out document data whose attribute value outputted from the attribute value generation unit 3 is equal to the attribute value held by an attribute value designation unit 6 which will be described below.

A display unit 5 displays document data which have been read out by the data readout unit 4. In this embodiment, CRT is used because it has higher speed display characteristics than liquid crystal display.

An attribute value designation unit 6 receives an attribute value to be a candidate of retrieval from a user through his designating operation, and then holds the attribute value until the retrieving operation has been completed. The attribute value designation unit 6 has a function similar to a well known key word designation unit for retrieving a key word.

A display data retrieving unit 7 reads out all the document data containing part of the document data displayed in the display unit 5, and retrieves all the document data to be displayed on the display unit 5.

Figure 4:
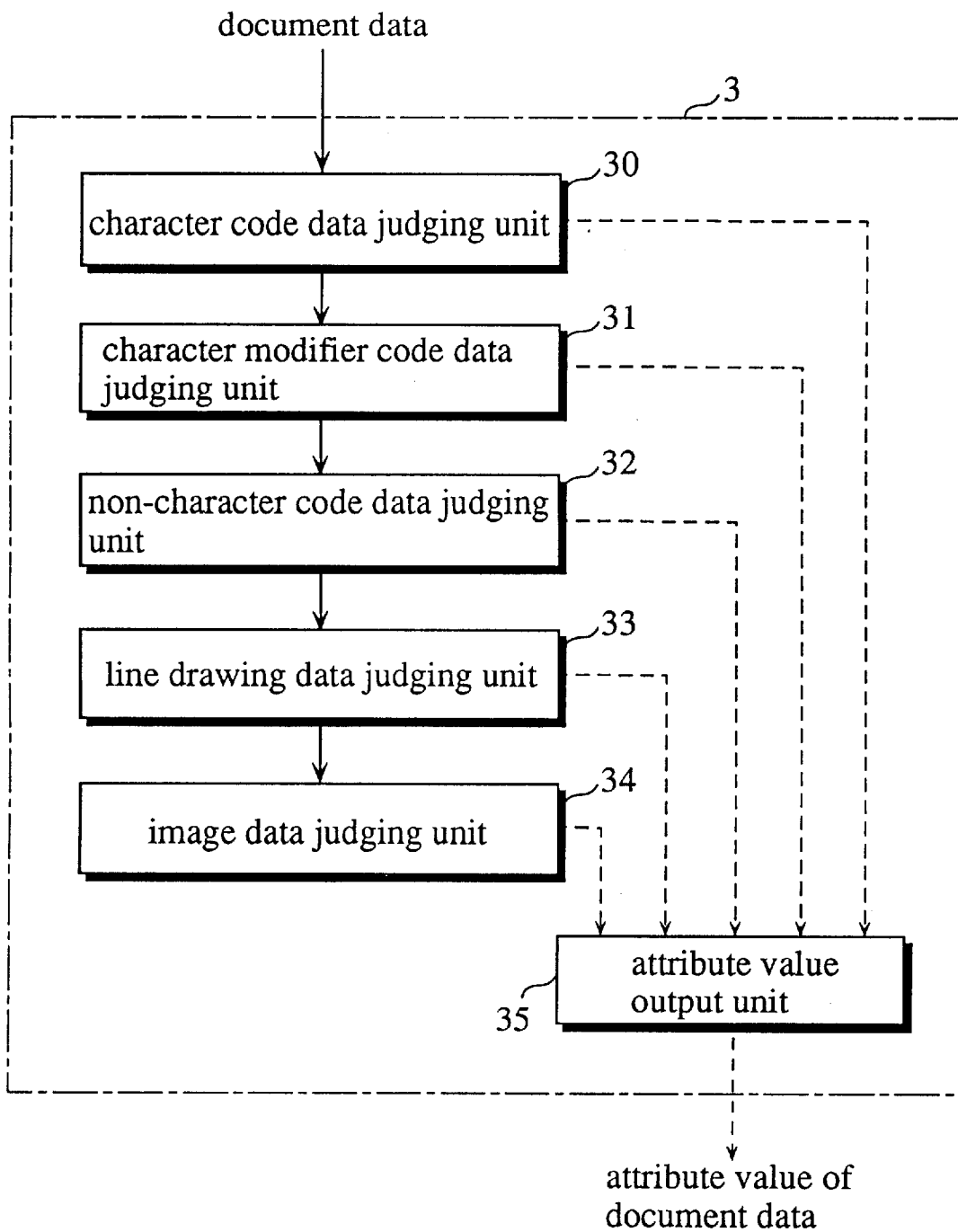
FIG. 4 shows the construction of the attribute value generation unit according to the first embodiment.

FIG. 4 shows each component of the construction of the attribute value generation unit 3 of this embodiment and the flow of signals among the components. The full line arrows indicate signals related to the document data, and the broken line arrows indicate signals related to the attribute values for the document data.

In FIG. 4, a character code data judging unit 30 judges whether the code data inputted to the data reception unit 1 contain character code data.

A character modifier code data judging unit 31 judges whether the code data inputted to the document data input unit 1 contain character modifier code data, and then outputs a judged result. The character modifiers can be underlined, hatched, magnified, longitudinally magnified, laterally magnified, italic, bold, shadowed, or inferior.

A non-character code data judging unit 32 judges whether the code data inputted to the document data input unit 1 contain code data other than character code data. The presence of non-character code data is judged by deleting character code data by collating their bit values electromagnetically because character code data are defined by JIS or others. Accordingly, in this embodiment, unusual characters whose code values have not been inputted as predetermined template are treated as foreign characters or drawings If no non-character code data are contained, the presence of the image data which Will be described below is not judged.

A line drawing code data judging unit 33 judges whether the code data inputted to the document data input unit 1 contain ling drawing code date. The lines in the line drawing code data are distinguished from underlines applied under characters by the presence or absence of a crossing straight line and a nearby character code data.

An image data judging unit 34 judges whether the code data inputted to the document data input unit 1 contain image code data depicted in dot patterns, and reports a judged result to an attribute value output unit 35.

The above-mentioned attribute value output unit 35 receives signals indicating the judged results from the character code data judging unit 30, the character modifier code data judging unit 31, the non-character code data judging unit 32, the line drawing code data judging unit 33, and the image code data judging unit 34, thereby reporting an attribute value corresponding to each judged result to the data storage unit 2.

Figure 5:
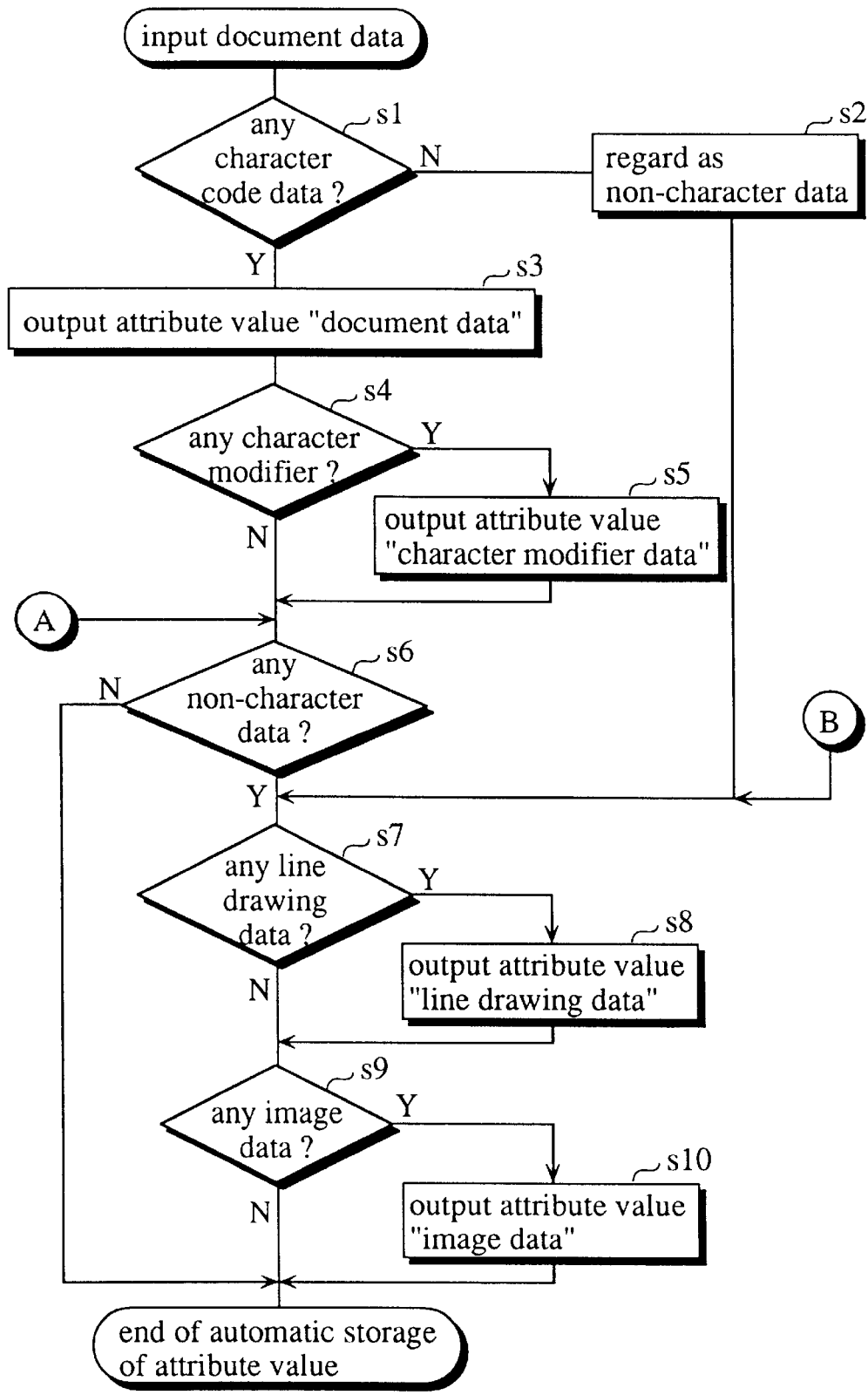
FIG. 5 is a flowchart depicting the operations of judging attribute values according to the first embodiment.

The operation of the document data filing apparatus of the present invention constructed as above is explained as follows with reference to the flowchart of FIG. 5.

The data reception unit 1 receives document data in the form of code data and outputs them to the attribute value generation unit 3 for automatically generating its attribute value.

First, the character code data judging unit 30 judges whether the code data inputted to the data reception unit 1 contain character code data (s1). If there is no character code data contained, the code data is regarded as non-character code data and sent to the line drawing code data judging unit 33 (s2).

In contrast, the presence of character code data has been detected, an attribute value representing the document data is generated and the generation is reported to the attribute value output unit 35 (s3).

Then, the code data is inputted to the character modifier code data judging unit 31, and the presence of character modifier code data is judged (s4).

If character modifier code data are contained, an attribute value "Character modifier code data" is reported to the attribute value output unit 35 (s5).

Regardless of the presence or absence of character code data and character modifier code data, the document data is sent to the non-character code data judging unit 32 where the presence or absence of non-character code data is judged (s6). If no non-character date are contained, the automatic judgement of the attribute value for the document data inputted is terminated. In contrast, when non-character date has been judged to be present or the document data has been judged to be non-character code data, the judging result is sent to the line drawing code data Judging unit 33, where the presence of absence of line drawing code data is Judged (s7).

If the line drawing code data judging unit 33 has acknowledged the presence of line drawing code data, the judging result is reported to the attribute value output unit 35 (s8).

Regardless of the presence or absence of line drawing data, the document data is sent to the image code data judging unit 34 where the presence or absence of image code data is judged (s9). If no image code data are contained, the automatic judgement of the attribute value for the document data inputted is terminated.

In contrast, when the presence of image code data has been acknowledged, the judged result is reported to the attribute value output unit 35 (s10). This is the end of the automatic judgement of the attribute value for the document data inputted is terminated.

The symbols X and Y in the flowchart will be explained below.

Based on these results obtained by the automatic judgement, the attribute value generation unit 3 outputs all the attribute values judged to be present in the document data.

The data storage unit 2 stores a table shown in FIG. 6 in its high speed semi-conductor memory 202, The table includes the title and attribute values of each document data, and the storing place of the document data itself in the hard disk 201. As explained before, the document data itself is stored in the hard disk 201 separately from these data because of necessary resources.

An operation for retrieving a desired document data with the use of these attribute values is carried out as follows.

The attribute value designation unit 6 holds an attribute value designated by the user, as a retrieval key.

The data readout unit 4 reads out, when line drawing code data is designated, document data containing the line drawing code data read out from the data storage unit 2, and temporarily holds it for display.

Finally, the display unit 5 displays the document data thus read out in a procedure which is described below.

These operations for retrieving a desired data will be detailed with reference to specific document data.

It is assumed that a user wants to retrieve document data containing drawing data from a number of document data stored.

The data reception unit 1 receives three different document data "a", "b", and "c" shown in FIG. 7A in the form of code data. The document data "a" and "c" contain both character code data and line drawing code data. The other document data "b" is exclusively composed of character code data.

The line drawing code data judging unit 33 in the attribute value generation unit 3 acknowledges the presence of line drawing code data in the document data "a" and "c", and outputs the judged results to the data storage unit 2 via the attribute value output unit 35. As for the document data "b", the absence of line drawing code data is reported. The judged results are shown in FIG. 7B. Accordingly, the data storage unit 2 stores the document data "a" and "c" as document data having attribute values for line drawing code data.

It is assumed that the user who wants to retrieve document data containing line drawing code data designates the attribute value for line drawing code data as a retrieval key. The attribute value designation unit 6 holds the designated attribute value.

The data readout unit 4 retrieves document data having the line drawing coda data held by the attribute value designation unit 6, as an attribute value, and as a result reads out the document data "a" and "c". Finally, these document data "a" and "c are displayed as shown in FIG.7C. They can be displayed on the same screen at once or separately in accordance with a direction of the user.

Figure 8:
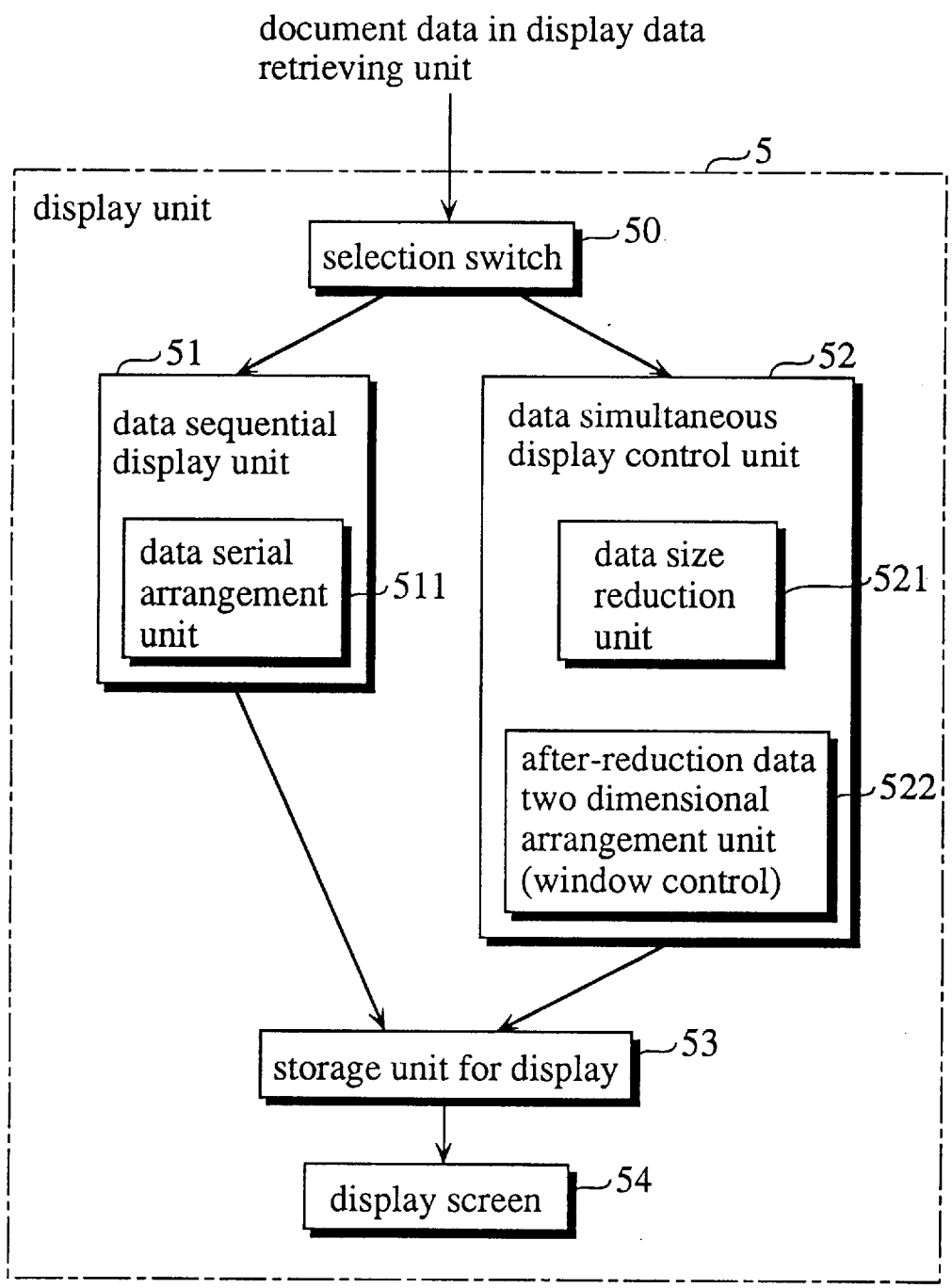
FIG. 8 shows the main part of the display unit 5.

The main part of the display unit 5 shown in FIG. 8 is composed of a selection switch 50, a data sequential display unit 51, and a data simultaneous display unit 52.

The selection switch 50 forwards a plurality of document data retrieved in accordance with the user's direction either to the date sequential display control unit 51 or the data simultaneous display control unit 52.

The document sequential display control unit 51 displays a plurality of document data read out by the data readout unit 4 one by one. The document data thus retrieved are arranged by a data serial arrangement unit 511 provided in the data sequential display control unit 51 in the order that they have been stored to the data storage unit 2. Then, the arranged document data are stored to the storage unit 53 for display and displayed an a display screen 54.

The data simultaneous display control unit 52 controls concurrent display of all the document data which have been read out by the data readout unit 4.

The size of the document data to be displayed in the display screen 54 is reduce by half in a horizontal direction because every other pixel on scanning lines is taken away by a data size reduction unit 521 provided in the data simultaneous display unit 52, and also reduced by half in a vertical direction because every other horizontal scanning line is taken away in the same manner, As a result, the display area is reduced to one fourth of the original.

Then, a group of four different document data is arranged two by two in every direction in the form of a single data by an after-reduction data two dimensional arrangement unit 522 which is also provided in the data simultaneous display unit 52, and a plurality of such groups each composed of these four different size-reduced data are arranged serially so that they can be displayed on the some screen all at once.

Furthermore, these groups of data are stored in the storage unit 53 for display as a single image date and displayed sequentially.

In order to retrieve document data, characters or words must be recognized, so that displaying the contents of document data in a smaller size or displaying the contents of a plurality of document data concurrently in one screen is not preferable. However, there is no problem in retrieving a desired document data by displaying its visual features such as a word written in capital letters when the other words are written in small letters, an English sentence inserted in a Japanese document, or graphs. Consequently, it is faster for the user to retrieve the desired data by checking the visual features that are displayed four by four at a time on a screen than to retrieve it by checking document data that are displayed one by one at a time. The technique of displaying a plurality of size-reduced data arranged two by two in every direction all together on a screen is well known and not explained in detail.

In the present invention, displayed images are not scrolled down but paged so that retrievers can recognize desired data easier.

Figure 9:
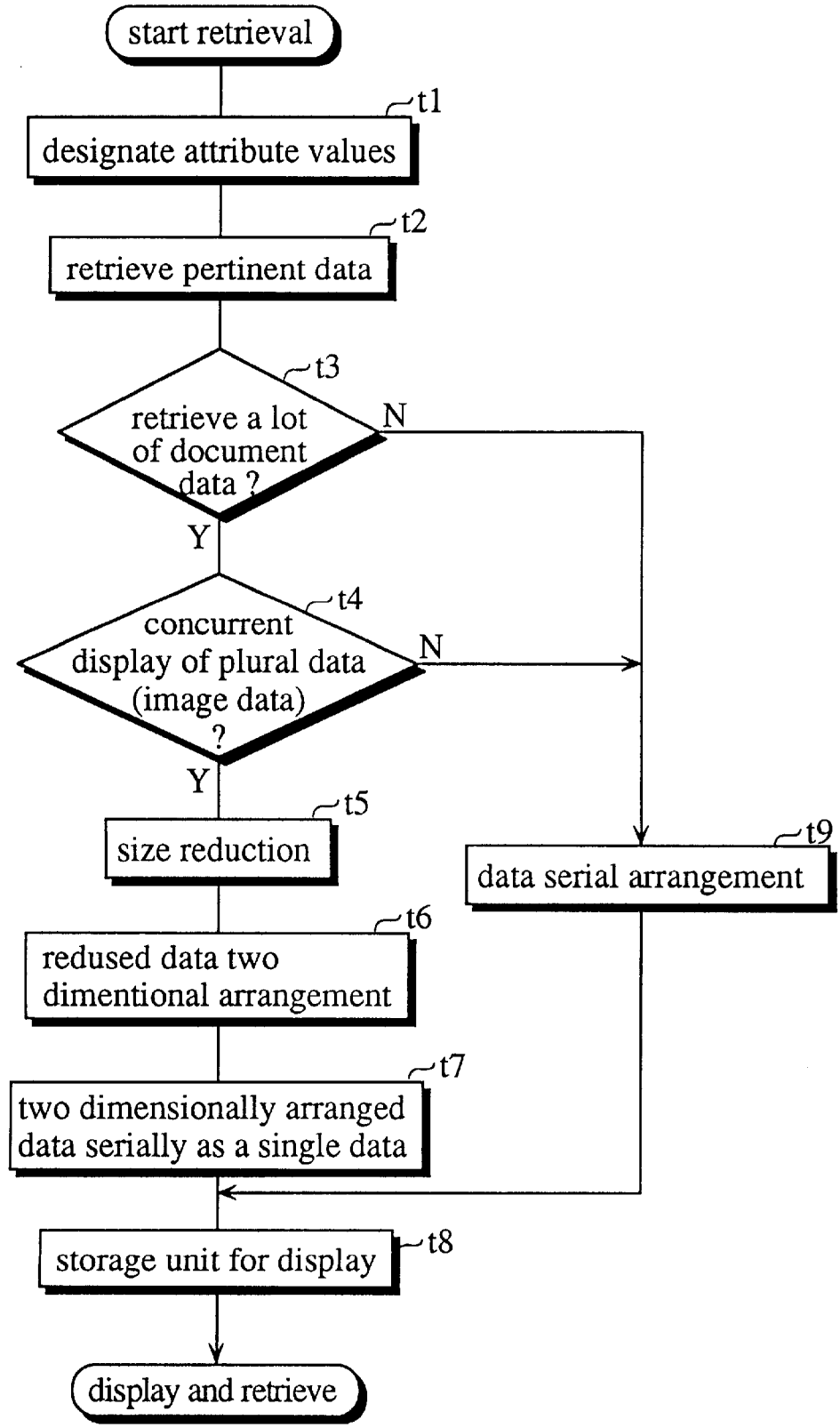
FIG. 9 is a flowchart depicting the operation of displaying document data for the purpose of data retrieval.

The following is an operational description of the display unit 5 with reference to the flowchart in FIG. 9 depicting the display processing operation depending on the number of document data which have been retrieved.

It is assumed that an attribute value of a document data to be retrieved is designated (t1) and the document data has been retrieved by using the attribute value as a key word (t2).

When a few number of document data have been retrieved (t3) or when document data exclusively composed of character code data are to be retrieved (t4), these document data are displayed one by one on the screen for the user to retrieve a desired one. Accordingly, document data are serially arranged in the order that they have been created (t9), sent to the storage unit 53 sequentially (t8), and displayed one by one in a speed directed by the user.

On the other hand, when a very large number of document data have been retrieved (t3) or document data containing easily recognizable data such as drawings are to be retrieved (t4), they are simultaneously displayed.

In this case, each of the retrieved document data is reduced in size (t5), and the reduced document data are divided into groups and arranged so that they are displayed on a screen altogether at the same time (t6). The groups each composed of four size-reduced document data are serially rearranged so that they are displayed as a single data on a screen (t7). Then, the groups are sent to the storage unit 53 (t8) and displayed in a predetermined speed. The size-reduced document data may be specified from characters or words; however, they are mainly specified based on the presence or absence of character modifiers inputted as attribute values for retrieval, such as underlined characters or enlarged characters, or on the positions and arrangement of these characters on a page.

It is possible to add to the apparatus of this embodiment another function of displaying the number of document data to be displayed on the display screen 54 for the convenience of the operation of the selection switch 50.

Although the number of line drawing data and image data of dot patterns included in one document data, and their positions on a page, and page numbers are ignored in the present embodiment, they may be produced as supplemental attribute values and used for retrieval. This can be easily done by providing the data storage unit 2 shown in FIG. 6 with additional columns for the numbers, the positions, and the page numbers, and allowing them to be inputted as retrieval keys. Control signals including an end-of-line signal can be used to recognize the numbers and positions.

For the case of character date, the number of lines per page, characters per line of a document written in Japanese or Chinese, or the average numbers of words per line of a document written in European languages, which are obtained by counting the number of spaces between words may be produced as attribute values and used for retrieval, by using the end-of-line signal or the end-of-page signal to be inputted together with character data.

Information on the types of characters such as Kanji and alphabet may be produced as attribute values and used for retrieval. In order to recognize the types of characters, all the bit values may be collated with dictionaries or template. Besides this, the following rules may be used.

Japanese language which includes about 7000 commonly used characters and Chinese language which includes 14000 commonly used characters are expressed in 2 bytes. Therefore, these languages can be easily distinguished from alphabet languages by their bit numbers.

Japanese language and Chinese language can be distinguished from each other because Japanese language uses most significant three bits or least significant three bits for attribute information such as character forms.

In addition, attribute information composed mainly of Japanese language and partly alphabet words can be formed.

For the case of line drawing data, attribute values concerning the sizes and shapes of line drawing data as compared with the entire page may be produced and used for retrieval.

For the case of dot data, an attribute value may be generated based on the size and shape of an area composed of consecutive black pixels.

In the present embodiment, a large-sized retrieving apparatus is used for retrieving a large amount data stored in data files; however, the present invention is not restricted to such a large-scale use.

That is, the document data filing apparatus of the present invention makes users retrieve a desired document data by using its visual features that users remember or have been informed by other people as attributes. Therefore, elaborate programs such as dictionaries for collation or a calculation unit based on them are not necessary. The capacity of the document data store unit shown in FIG. 6 is small. On the other hand, notebook computers or their disks can store relatively a large amount of data because smaller-sized memory has become to have more capacity. Therefore, the present invention can be applied to the retrieval of data stored in the built-in or detachable disks of the notebook computers.

Furthermore, the present invention may be applied to word processors. In this case, documents formed in the word processors are provided with attribute values concerning their visual features, and detachable storage media which stores the document data are provided with identifier values corresponding to the attribute values for retrieval.

Figure 10:
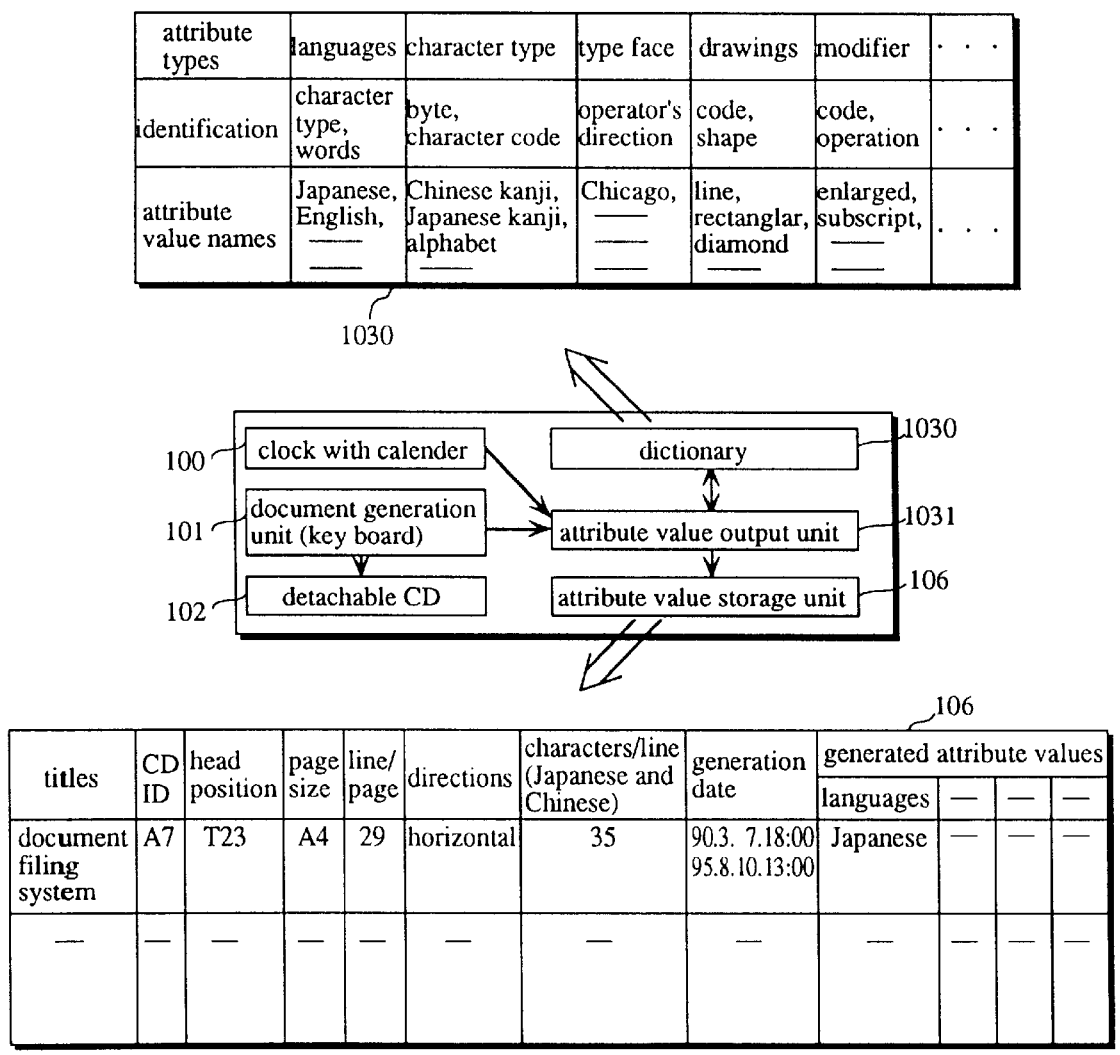
FIG. 10 shows the main part of a word processor which has the construction of the first embodimnent.
Figure 1:
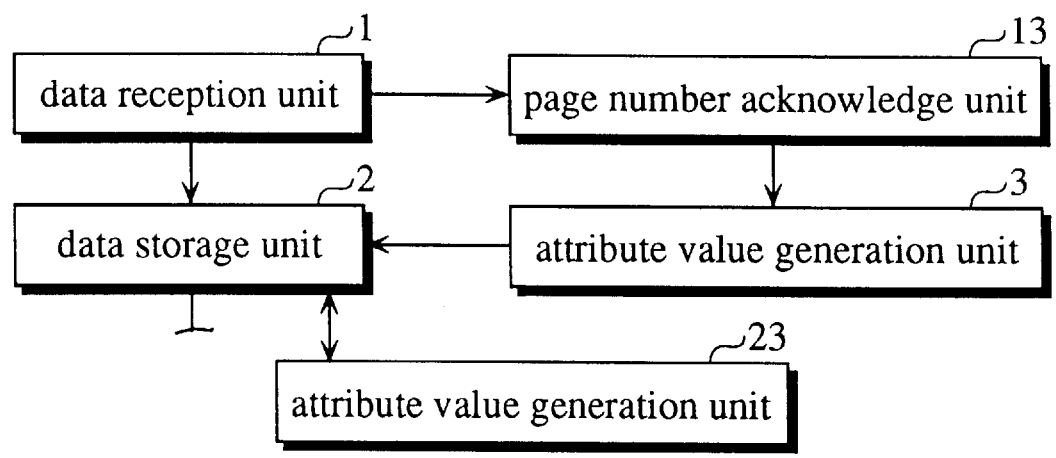
FIG. 1A shows the construction of a conventional document data filing apparatus.
FIG. 1B is a table showing various data stored for retrieval.
FIG. 1C is a part of the flowchart depicting data retrieving operation unique to this embodiment.

FIG. 10 shows the construction of the present invention applied to a word processor 12, which corresponds to the data reception unit 1 and the data storage unit 2. Like ordinary word processors, the word processor 12 comprises a document generation unit 101 including a keyboard, a detachable CD 102 for storing generated documents, a clock with a calendar 120, a dictionary 1030 for attribute value generation, an attribute value output unit 1031, and an attribute value storage unit 106.

The attribute value output unit 1031, when a user has generated a document by the document generation unit 101, detects an operation which indicates the completion of the document such as turning off the power switch of the document generation unit 101. Then, the attribute value output unit 1031 refers to the dictionary 1030 for attribute value generation, and outputs the attribute value of the completed document to the attribute value storage unit 106 The attribute value output unit 1031 also outputs information on a generation date obtained from the clock with a calendar 120.

The dictionary 1030 for attribute value generation has various types of attribute values, names of attribute values, and attribute value identification registered therein. The types of attribute values include pica, Chicago, and New York.

The attribute value identification include character codes and the presence or absence of frequently used words which are unique to one language such as "have" and "the" are unique to English. In some types of attribute values such as type face and the number of lines or characters per page, operations by users or expression control signals generated by the operations are used to identify attribute values.

The attribute value storage unit 106 is provided with memory which has a blank table as shown in FIG. 10 and fixed to a word processor. To make the column of titles, titles inputted by users for a title list stored in a CD provided to a word processor are used.

The CD identification numbers are inputted through users operation every time the CD is attached to or detached from a word processor.

The CD head positions indicate the head position of each produced document in the CD.

The columns of paper sizes, lines/pages, horizontal/vertical, and letters/lines (Japanese and Chinese) are written based on input operations of users. As the generation dates, the dates of the completion of documents, which have been obtained from the clock with a calendar 120 are used. Every time the documents are amended, the date of amendment is added.

For the other attribute values, attribute values outputted from the attribute value output unit are used.

The blank table can be applied to 18,000 documents under the conditions that the word processor is used to make ten documents per day, 360 days per year, and for five years.

Figure 3B:
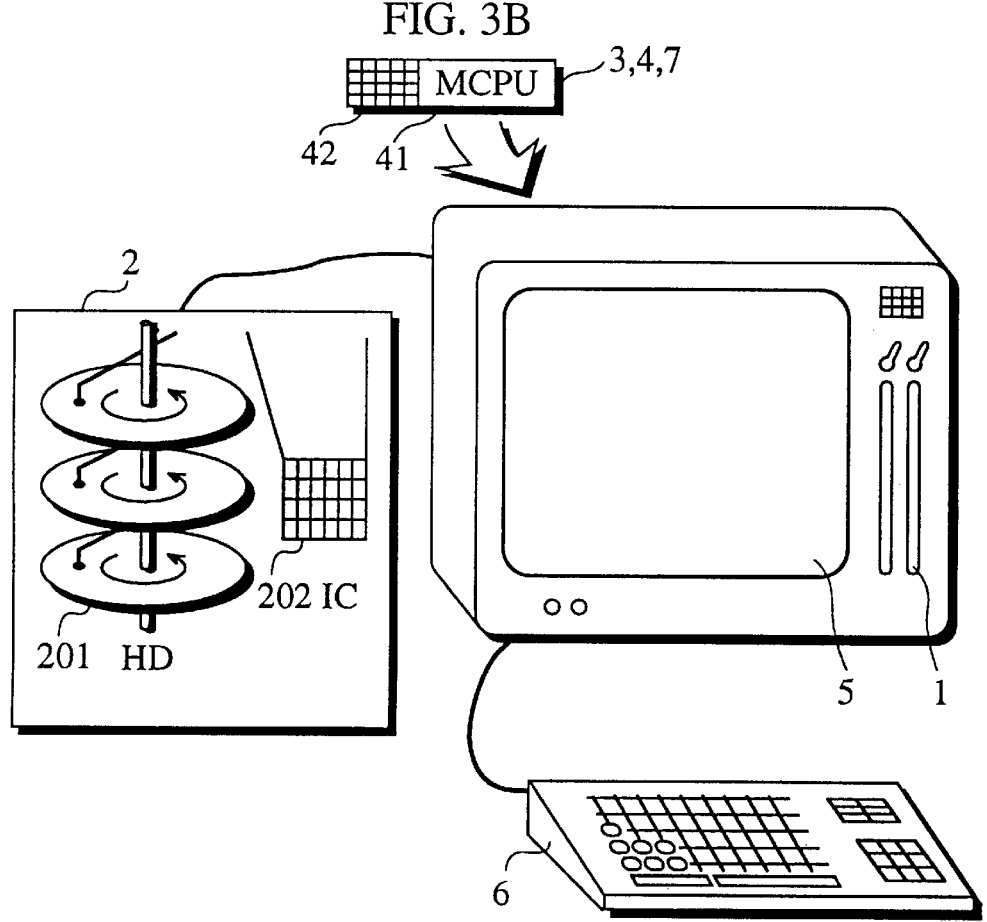
FIG. 3B shows the external appearance of the document data filing apparatus.

The technic of retrieving document data generated with the word processor, based on the attribute values written in the attribute value storage unit 106 is the same as the document filing apparatus shown in FIG. 3. The explanation is omitted.

Document data to be retrieved and disks which store the document data are specified and read out from the storage unit of the disks, to amend the document data.

The dictionary 1030 for attribute value generation, the attribute value output unit 1031, and the attribute value storage unit 106 ray be a hard disk, instead of being fixed to the word processor.

For the case of documents written in European languages, the average number of words per line may be outputted as attribute values instead of the number of characters per line.

For the case of a German document written in alphabet instead of German letters, it can be identified as a German document from the frequent use of "ue" corresponding to " ü" (umlaut) and that every noun begins with a capital letter even in the middle of a sentence. Therefore, it may be given an attribute value that a German document written in alphabet. The same thing can be applied to Japanese and Chinese written in alphabet In such a case, the language can be identified from the presence of frequently used words unique to the language, such as Japanese "Watashi" which means "I".

<Embodiment 2>

This embodiment provides increased effectiveness for retrieving document data consisting of a lot of pages and a few of the pages contain image code data.

The construction of this embodiment is basically the same as that of the first embodiment, so that the following description is focused on features unique to this embodiment.

Therefore, FIG. 11A showing the construction of this embodiment does not show components common to those in FIG. 3 showing the construction of the first embodiment except that a page number acknowledging unit 13 and an attribute value generation unit 23 are additionally provided.

The page number acknowledging unit 13 acknowledges the number of pages of each document data that has been inputted to the data reception unit 1, based on a start-of-page signal and a end-of-page signal both assigned to the document data, when the document data is sent to the attribute value generation unit 3. In response to this, the attribute value generation unit 3 outputs an attribute value for each page.

The attribute value generation unit 23 ORs all attribute values for every page of a document data, thereby generating attribute values for the entire document data. The attribute values thus generated are stored in association with the title of each document data to the document data storage unit 2.

The table of FIG. 11B shows a document data titled "document data filing apparatus", which also appears on the table of FIG. 6, stored in the high speed semi-conductor memory 202 for a data retrieving operation. Each page of the document data filing apparatus is provided with an attribute value. As is shown in the table, the document date consists of four pages and only the third page has line drawing data. The column of TOTAL shows the logical OR of all the attribute values for every page, which represents the attribute values for the entire document data of the document data filing apparatus".

Figure 11C:
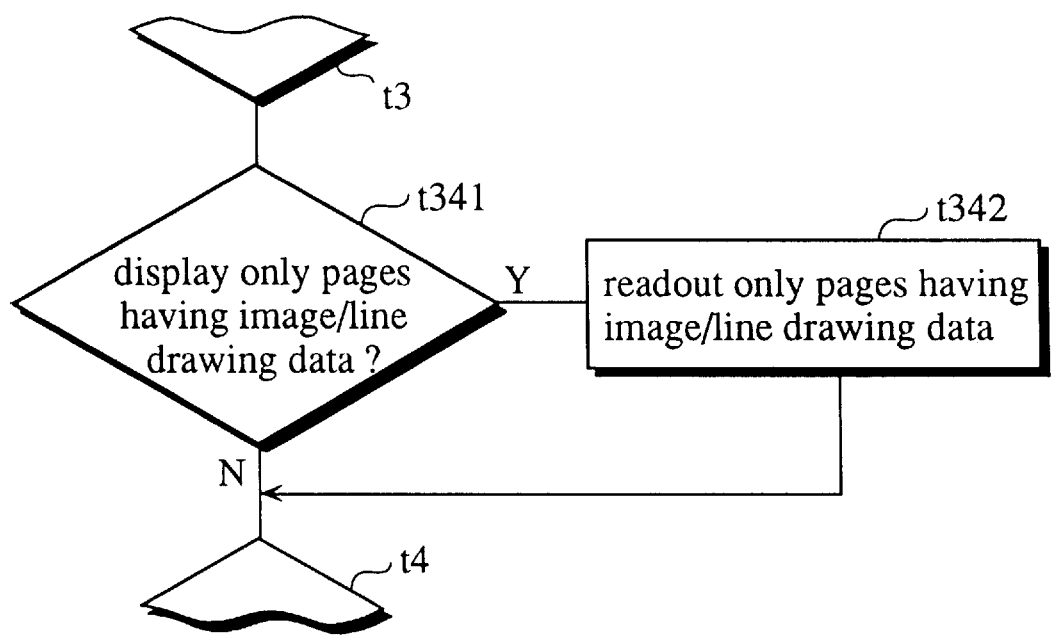
FIG. 11A shows the construction of the document data filing apparatus according to the second embodiment.
FIG. 11B is a table showing data stored in memory of data storage unit, the data including titles, attribute values, and storage locations of document data.

FIG. 11C is a part of the flowchart for data retrieval which is unique to this embodiment. The part corresponds between the steps (t3) and (t4) of the flowchart shown in FIG. 9 of the first embodiment.

In the step (t341), when it has been detected that there are a large number of document data corresponding to attribute values inputted as keywords and also when each of the large number of document data consists of a lat of pages, it is judged whether all the pages of each document data are displayed or only the pages having line drawing data or image data are displayed.

If the latter is selected, these pages only are read out for display (t342).

Hereinafter, the same procedure as after the step (t4) in the flowchart in FIG. 9 is taken.

<Embodiment 3>

First of all, the object of the present embodiment is explained as follows.

For the case where a page in a desired document includes a small drawing, it is easier for users to examine an enlarged display of the drawing than to look at the entire page.

The display screens of notebook computers are as small as about 12 cm by 19 cm for the portability. This is much smaller than those of desk top computers shown in FIG. 3B. Therefore, it is difficult to display the entire page on the display screens of notebook computers for data retrieval. If it is displayed by reducing its size, drawings become to small for users to examine. Thus, it is more convenient for users to display an enlarged display of the drawings.

In the present embodiment, in view of this, drawings are taken out from a desired data and displayed to recogni2e and specify the desired data.

Consequently, this embodiment is basically the same as the second embodiment, or can be regarded as an application of the second embodiment. The feature unique to this embodiment is that the attribute value generation unit 3 is further provided with an image data generation unit 31 for data retrieval and that the data storage unit 2 stores the image data thus generated in the manner that they can be used for data retrieval, and has a storing place for them.

The following is a description on features unique to this embodiment.

Figure 12:
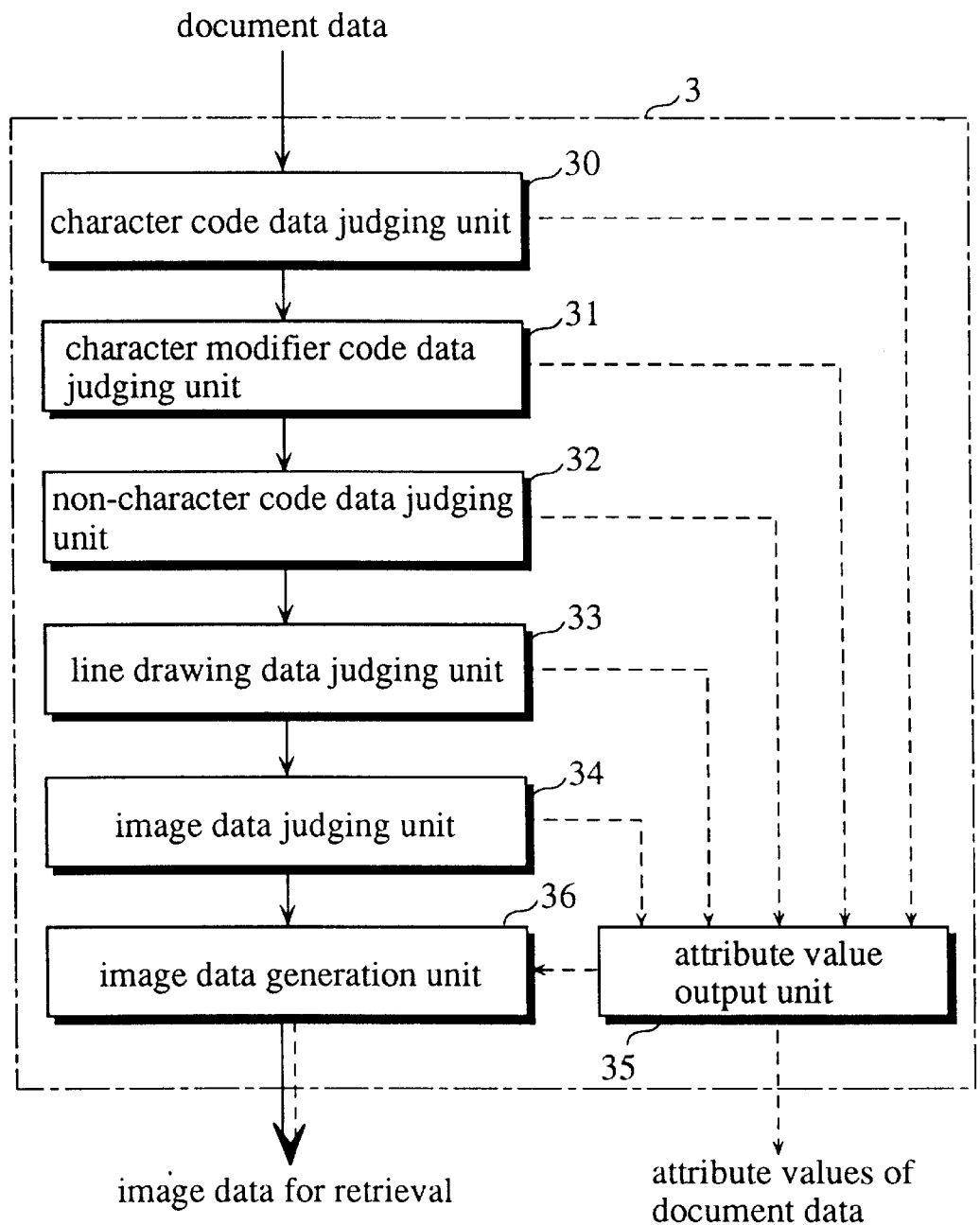
FIG. 12 shows the construction of the document data filing apparatus according to the third embodiment.

The attribute value generation unit 3 of this embodiment is shown in FIG. 12, which is basically the same as FIG. 4 except that an image data generation unit 36 for data retrieval is additionally provided.

Upon receiving a notice from the attribute value output unit 35 that the document data inputted in the form of code data contains line drawing data or image data, the image data generation unit 36 selects the line drawing data or image data from the code data, with a help of the line drawing code data judging unit 33 and the image code data judging unit 34. the image data generation unit 36 further detects character code data through electronic collation, thereby generates line drawing code data and image code data. Then, the line drawing code data and image data thus generated are outputted together with the attribute value of the document data to the data storage unit 2.

Figure 13B:
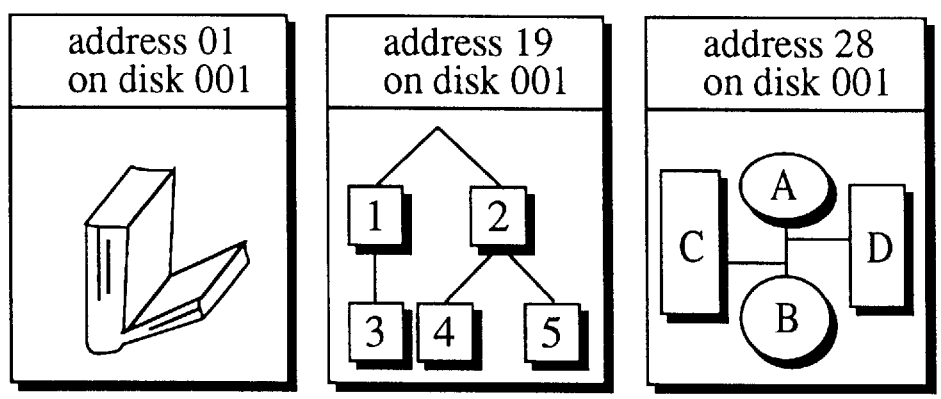
FIG. 13B shows image data generated.

The storage unit 202, on the other hand, stores the image data generated by the attribute value of generation unit 3, in association with the attribute value of document data including the image data. FIG. 13A shows a table that the high speed semiconductor memory 202 has. The table shows image data generated for data retrieval, which are associated with the titles of the document data and the staring place in the hard disk of the document data themselves.

The table is different from the tables shown in FIGS. 6 and 11B in the first and second embodiments respectively in that it contains the storing places of the image data. Accordingly, the hard disk 201 in the data storage unit 2 has an area to store the image data besides the area to store the document data themselves. In the table of FIG. 13, the column of TOTAL shows page numbers which have image data. The column of page 3 shows the storing place of the image data stored in the hard disk 201. The image data for data retrieval is stored in the leading position of a corresponding document data. As is apparent from the comparison between FIG. 13A of this embodiment and FIGS. 6B and 11B, the storing place of each document data itself is slid backwards to make space for the image data.

Figure 14:
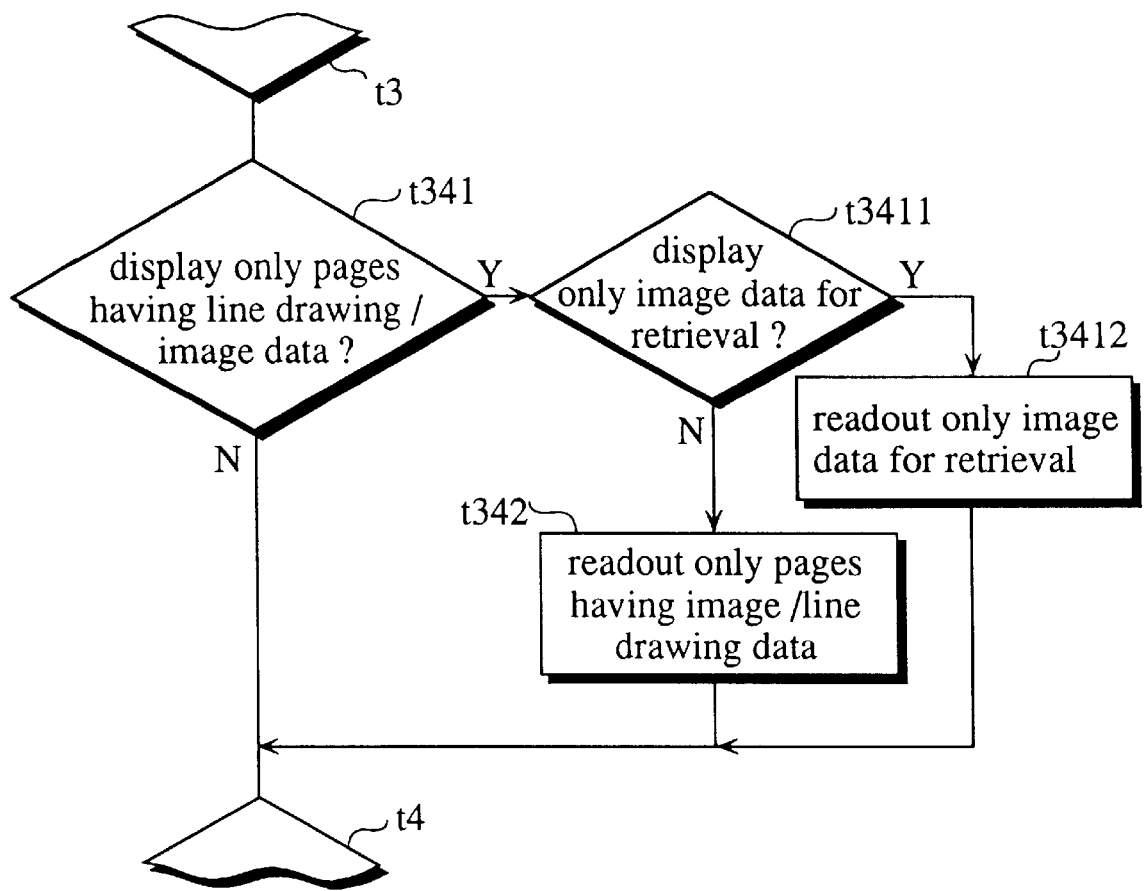
FIG. 14 is a part of the flowchart depicting data displaying operation unique to this embodiment.

The data retrieving operation unique to this embodiment is described as follows with reference to the flowchart shown in FIG. 14, which is basically the same as the flowchart in FIG. 11C for the second embodiment. The only difference is that when a page containing line drawing data or image data is exclusively displayed (t341), the user can select between displaying only the line drawing data or image data and displaying the whole page intact (t3411). And in the former case, these data are read out from the hard disk 201 (t3412) and displayed. If the user has found the desired document data from the document data being displayed on the display unit 5, he makes the entire document data or the entire page containing the image data be displayed on the display unit 5. Needless to say, the operation for displaying the subsequent image data which have been retrieved based on attribute values is suspended at this point. Since the image data are stored in the leading position of each document data in the hard disk 201, they can be read out quickly and also be displayed quickly because various processes required for displaying character data are unnecessary. In addition, the amount of display that the users have to observe for data retrieve is reduced, which contributes to the reduction in their eye strain.

When drawings are smaller than a predetermined degree of the entire page size, another function of enlarging the small drawings and displaying the enlarged drawings according to a user's direction may be added.

A way of enlarging a pixel by doubling it in vertical and horizontal directions, thereby making 2×2 pixels is well-known, so that its explanation is omitted.

Since the width of display screens of notebook computers is usually greater than the height, when several drawings are displayed at the same time, they are usually arranged in the horizontal direction, unlike the first embodiment.

Needless to say, the enlargement ratio is so determined that enlarged drawings do not exceed the size of the display screen.

<Embodiment 4>

This embodiment is related to foreign language document date which are regarded as drawing data because they can be easily recognized by their unique appearance and make it possible to generate each attribute automatically.

Since this embodiment has basically the same construction and effects as the foregoing embodiments, features unique to this embodiment are exclusively explained as follows.

Figure 15:
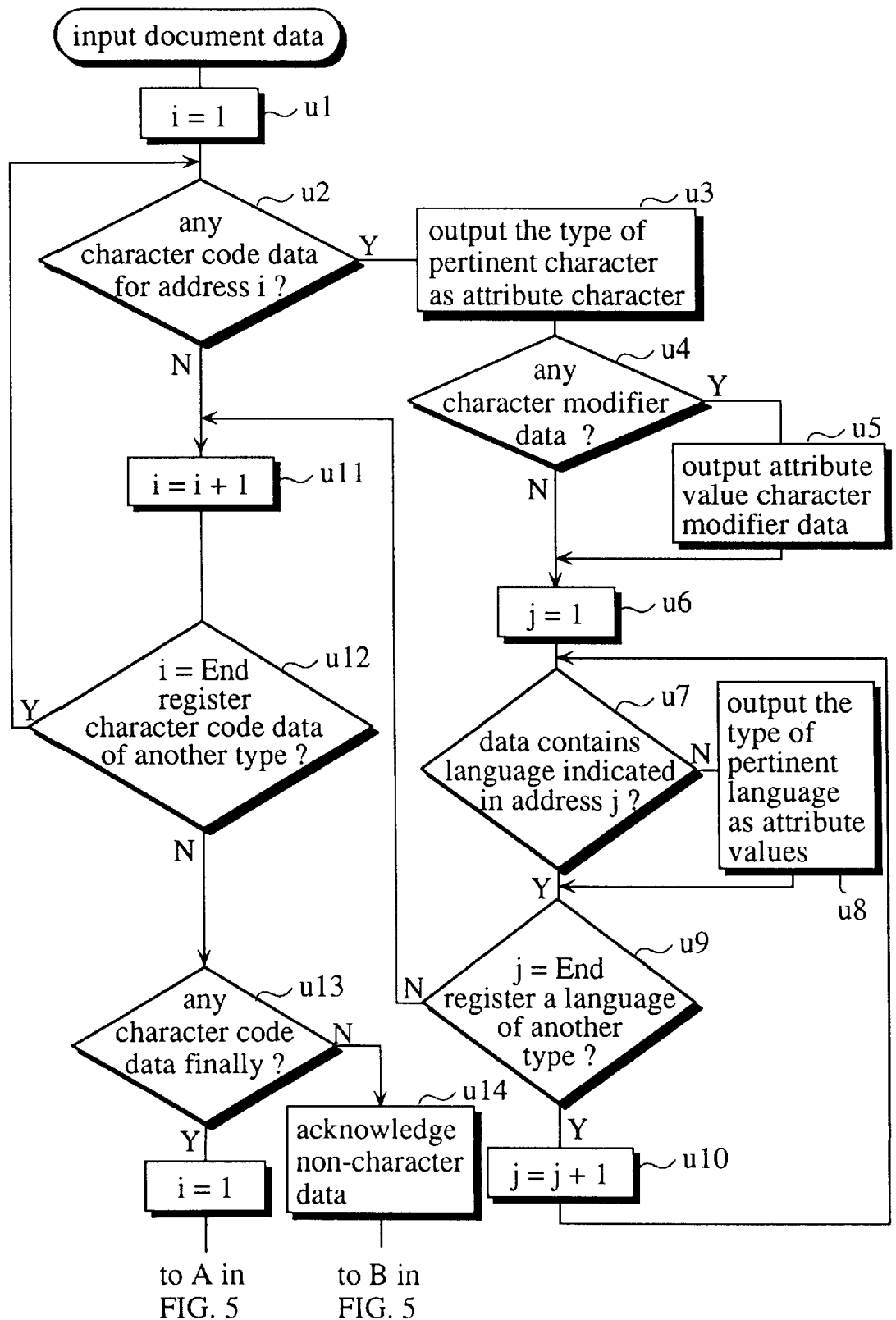
FIG. 15 is a flowchart depicting the operation of generating attribute values for document data unique to the fourth embodiment.

FIG. 15 shows a flowchart depicting an operation for outputting foreign language characters or words as attribute values. This flowchart explains effects unique to this embodiment and corresponds to steps 1 through 5 in FIG. 5 which leads to "X" and "Y".

FIG. 16 is a table showing code data which are used for recognizing character codes. The table is registered in unillustrated storage units in the character code data judging unit 30 and the character modifier code data judging unit 31.

The different foreign languages in which document data of this embodiment are written are identified as follows, with reference to FIGS. 15 and 16.

Language having unique characters such as Japanese, Korean, and German are easily distinguished. Even if the same characters are used in different languages, each language can be easily identified by retrieving some words that are frequently used in the language. For example, alphabet is used commonly in English, German, and other European languages; however, English has some words unique to itself such as "I", "it", "is", and "but", while German has "Ich", "es", "ist", and "aber". German has another alphabet "ue" corresponding to umlaut.

Any language and any field can be identified from only 20 words or so which are unique to a language or a language field because they are frequently used only in the language or the language field. Consequently, large-scale dictionaries are not necessary for collation. In addition, the dictionaries can be easily produced even by producers whose mother tongues are different from the languages of the dictionaries. Unlike making various dictionaries present electronic, there is no problem of copy right. Furthermore, fewer collation is necessary, and a language can be quickly identified with simple apparatus.

In addition, some widely used and unique words reveal the age in which document data are generated and their fields. In such a case, about 200 words are necessary to identify the language, but it is still small. Since they are information on visual features, the field of data may be vague.

Although the table includes the titles of the document data, storing locations, special characters as attribute values, and the kind of the languages, they are not shown because they are equal to FIGS. 6 and 11A.

The operation according to this embodiment is explained as follows with reference to the flowchart of FIG. 15.

When a document data is inputted, it is first judged whether the document data is written in Japanese language (u1,u2) from the presence or absence of Japanese hiragana/katakana alphabet code data, which is unique to Japanese. When the code data is present, "Japanese Language" is outputted as the attribute value (u3), and then it is judged whether a character modifier is present (u4). When it is present, "character modifier code data" is outputted as the attribute value (u5). The attribute value generation process for Japanese hiragana/katakana alphabet is terminated here (u7 and u8 are absent) and then it is judged whether the character code for Kanji (i=2) is present (u11, u12, u2).

Because of the presence of hiragana/katakana characters, the document data is regarded to be written in Japanese language, regardless of the presence or absence of Kanji unique to Chinese language.

Then, it is judged whether Kanji is present (u2 when i=2), and further judged whether the document data is for adults or children (u7, u8 when J=2) from the ratio of hirigana/katakana characters in the entire character codes, and from the number of characters contained in a page of A4 version. Furthermore, it is judged whether the document data is written in old Japanese or modern Japanese from the frequency of kanji which is rarely used now (u7, u8 when j=3). It is judged whether character code data other than those for Kanji belong to the code data for other language such as the Hangul alphabet (J-2, J-5) (u11, u12, u2).

When character code data which are commonly used in different languages such as alphabet have been judged to be present (u2 when i=4), the correct language is judged from the presence or absence of words unique to the language (u7, u8, u9, u10 when i=5, j=1, 2, 3, . . . ).

When it is judged that all the process for alphabet has been completed (u9 when i=5), then the presence or absence of German letters is judged (u11, u12, u2).

When it is judged that the presence or absence of German letters is completed (u9), then the presence or absence of Russian letters is checked (u11). German letters and Russian letters are exclusively used for German language and Russian language, respectively. Therefore, there is no possibility that they are used for other languages.

Finally, when the presence or absence of all the registered characters has been checked (u12), whether the document includes any character is judged (u13). If there is any character, then "i" is made equal to "1", and the process goes to (s6) shown In FIG. 5, where the presence or absence of non-character data is judged. On the other hand, when the document includes no character, then it is judged to be a non-document data (u14), and the process goes to (s7), where the presence or absence of line drawing data is judged. Thus, (u14) corresponds to (s2) shown in FIG. 5.

The process in u7 and u8 shown in FIG. 15 is explained as follows by taking the case of alphabet. After the presence of alphabet characters is found, the presence of any word unique to a language generally written with alphabet such es English, French, and German is quickly judged (u7, u8, u9, and u10 when i=5) by recognizing spaces between words.

For the case of Japanese language, Kanji characters followed by specific hiragana characters such as particles " ", " は" are processed.

For the case of Chinese, morpheme analysis or the maximum word correspondence method is used. The dictionary used for the morpheme analysis can be a small one because only frequently used words or Kanji character characteristic to Chinese language such as " 于", " 的", " 较" are processed.

In the table shown in FIG. 16, document data written in Japanese language are further divided into Japanese for adults, for children, and old Japanese. This can be applied to other languages such as English by checking, for example, whether "hast", which is archaic of frequently used word, "have" is used. Furthermore, attribute values may be outputted by judging whether the document data is technical, patent, or the like from the presence of arithmetic symbols (as a kind of word) such as "=" and "−" or from patent terms such as "patent" or "invention" which are frequently used in a special field.

<Embodiment 5>

Although this embodiment is different from the first embodiment in that document data to be used are not code data but inputted through light/electric conversion (hereinafter L/E conversion). The feature unique to this embodiment is exclusively explained hereinafter.

Figure 17:
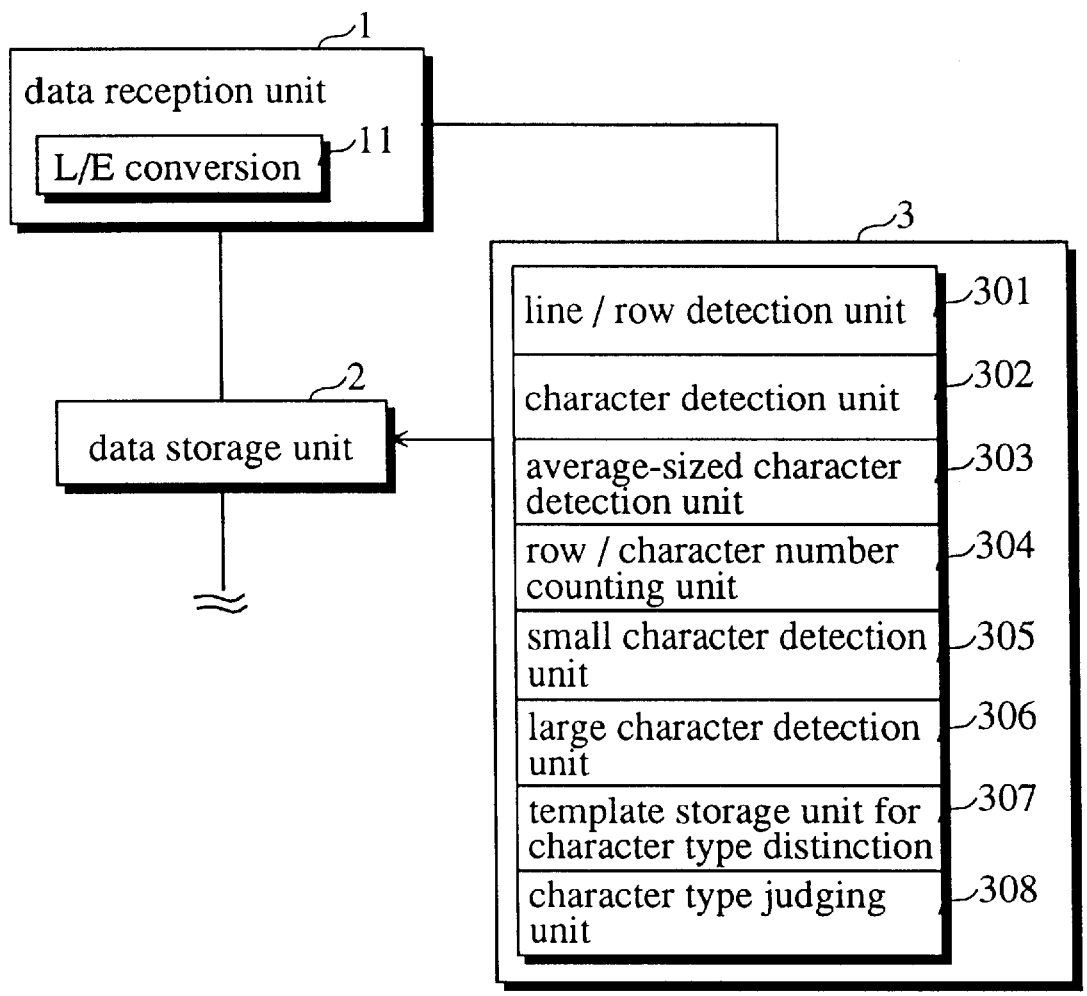
FIG. 17 shows a part of the construction of the document data filing apparatus unique to the fifth embodiment.

In FIG. 17, the unillustrated portion under the document data storage unit 2 includes the same components as those in FIG. 3. The construction of this embodiment is different from the first embodiment in that the document data input unit 1 has an L/E converter 11 and the attribute value generation unit 3 has a line/row detection unit 301, a character detection unit 302, an average-sixed character detection unit 303, a row/character number counting unit 304, a small character detection unit 305, a large character detection unit 306, a template storage unit for character type distinction 307, and a character type judging unit 308. As a result, the attribute value generation unit 3 outputs as attribute values "appropriate character numbers in a page", "appropriate character numbers in a line", "annotation", and "headline", and the document data storage unit 2 stores these attribute values for data retrieval.

In accordance with the increase in the attribute values, the attribute value designation unit 6 is slightly changed in order to receive retrieval keys, and the construction of units in charge of compression, decoding, display, and print are also changed in addition to the storage of document data inputted through L/E conversion. However, they are well known and not described.

Figure 18:
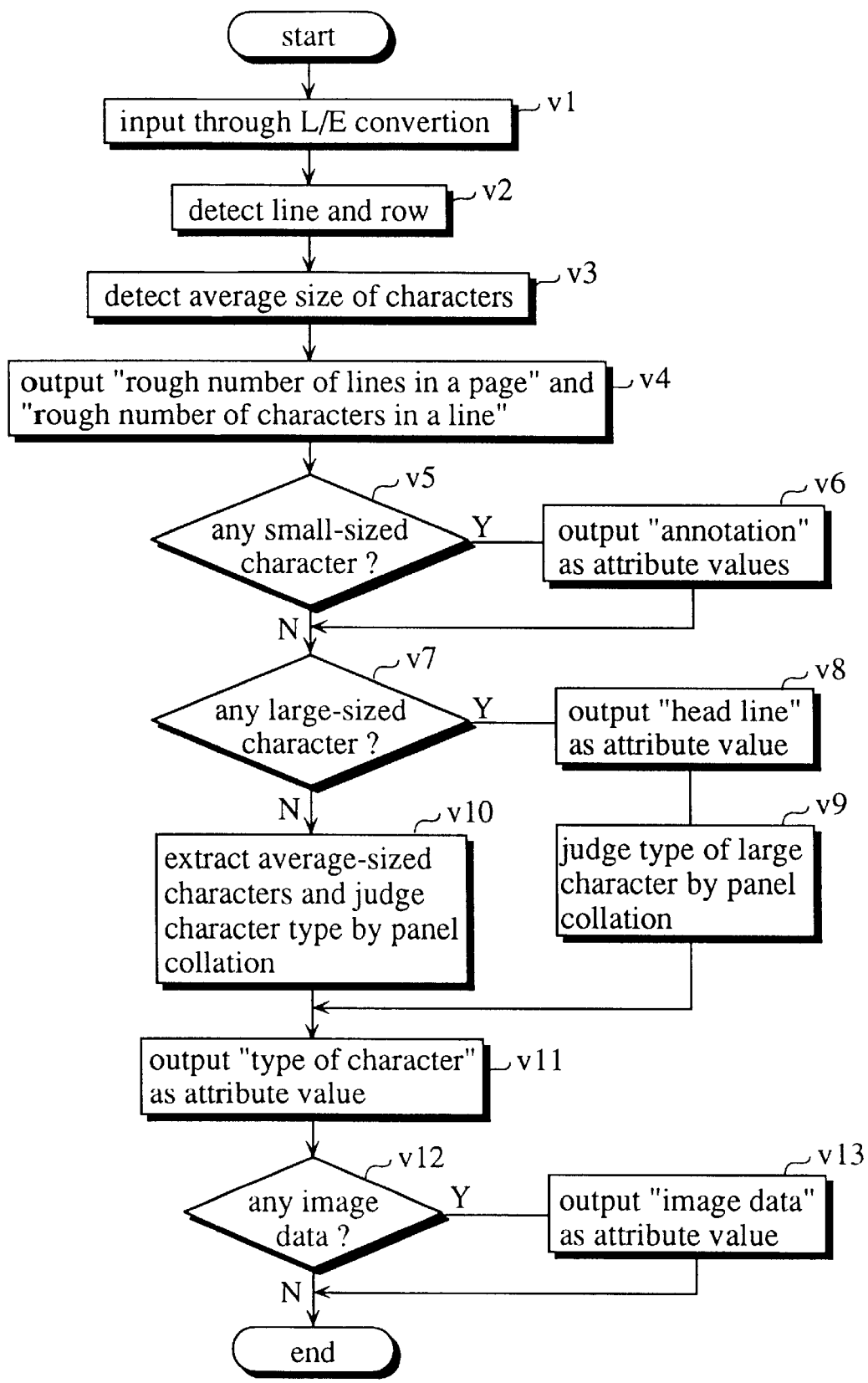
FIG. 18 is a flowchart depicting the operation of the attribute value generation unit according to the fifth embodiment.
Figure 20:
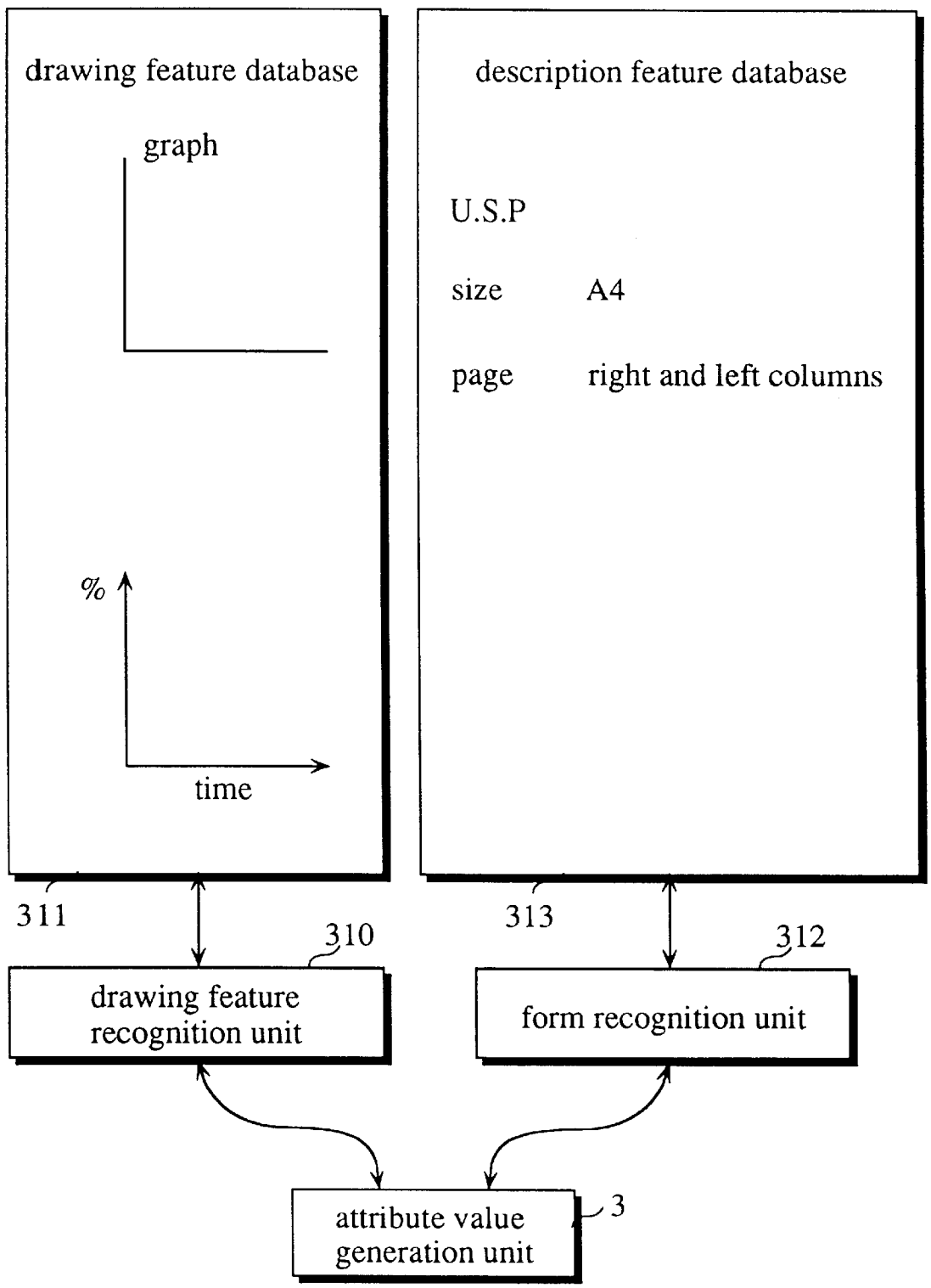
FIG. 20 shows the construction of the main part of the fifth embodiment.

FIG. 18 Is a flowchart depicting the operation of each unit in the attribute value generation unit 3.

A document data is inputted through L/E conversion (v1). The line/row detection unit 301 detects line and columns of document date from the presence or absence of black pixels in a main scanning direction and in sub scanning direction (v2).

The character detection unit 302 detects characters from the rows and columns detected by the line/row detection unit 301, the fixed aspect ratio of the print letters, and white pixels between adjacent characters. The average-sized character detection unit 303 judges the size of characters which comment a majority among the characters detected by the character detection unit 302 (v3).

The line/character number counting unit 304 counts the rough number of lines in a page and the rough number of characters in a line, and then outputs them as the attribute values of the inputted document data (v4).

The small character detection unit 305 Judges the presence or absence of small characters from the presence or absence of white pixels between characters, based on the result of the average character detection unit 303 (v5). When a small letter has been judged to be present, then "annotation" is outputted as an attribute value (v6).

The large character detection unit 306 judges the presence or absence of large characters and bold characters (v7), and it any, "headline" are outputted as attribute values (v8). These large characters are distinguished from Capital letters in some European languages by the presence of spaces between words, and necessary amendment are applied.

The character type distinction unit 308 extracts large characters or bold characters, if any (v9), and otherwise extracts some average-sized characters from each part on a page (v10) Furthermore, the character type distinction unit 308 electronically collate them with the template in the template storage unit 307, thereby judging the type of characters and outputting them as the attribute values (v11). Unlike alphabet, Kanji has a great number of characters, so that frequently used and very simple characters such as " ", " 人", or " 入" are stored as template.

Furthermore, the image data judging unit 34 judges the presence or absence of image data (v12) from the number of consecutive black pixels and then outputs the image data, if any, as the attribute value (v13).

The following is a description on the principle of (v11) and (vl2).

With regard to (v11), FIG. 19A and FIG 19B show part of patent applications written in Chinese language and Japanese language, respectively. As apparent from them, all the printed characters of these languages can be within the same size of squares.

Therefore, after lines and rows are extracted, these squares are extracted to examine the ratio of black pixels to the entire pixels in each square. Then, squares with fewer black pixels, that is, characters with fewer strokes are found and collated with the template (pattern matching). The characters indicated with downward arrows are those to be used only or mostly in Chinese characters. The characters indicated with upward arrows are kana alphabet consisting of about 50 characters unique to Japanese language. Thus, these characters can be used to distinguish between Japanese language and Chinese language, and as a result, the capacity of the template can be small.

With regard to (v12), drawings contained in a document have much greater number of consecutive black pixels than average characters, so that they can be easily distinguished from each other.

Accordingly, the attribute value related to visual features of the document data inputted through the L/E conversion is automatically generated and stored in the storage unit for data retrieve together with the storage site of the document data itself and the title of the document data, which is inputted through the keyboard. The attribute value is used as a key word for data retrieval.

The character with few strokes such as alphabet characters, hiragana/katakana characters, and some Kanji with few strokes are now easily distinguished by extracting characters and symbols composed of few black pixels. They may be used to generate character data as attribute values in the same manner as in the fourth embodiment.

Furthermore, Kanji, hiragana/katakana, and alphabet have their own spaces between their characters and words, so that when some English sentences are included in a Japanese document, they exhibit different character arrangement from the rest of the document. In addition, there may be some change in the width of band composed of black or white pixels. Thus, a word can be extracted from the arrangement to be collated with the dictionary, thereby outputting an attribute that some English sentences are included in a Japanese document.

<Embodiment 6>

The present embodiment is an improvement of the fifth embodiment. The attribute value generation unit 3 of the fifth embodiment shown in FIG. 17 comprises a drawing feature recognition unit 310, a drawing feature database unit 311, a form recognition unit 312, and a form feature database unit 313. The attribute value generation unit 3 can output recognized drawing features and form features as attribute values related to visual features. It is also possible to input the attribute values as keywords to retrieve desired data.

The following description is focused on these features of the present embodiment.

The drawing feature recognition unit 310 and the form recognition unit 312 recognize lines of consecutive white pixels or black pixels among inputted dot data. From the features of the lines, the drawing feature recognition unit 310 finds the features of the drawings, and the form recognition unit 312 finds the types of the drawings, thereby collating them with the database in order to output necessary attribute values.

The features of the drawings are found from the lines of consecutive while pixels or black pixels as, follows.

A straight line is recognized by black pixels which form a line. As shown in FIGS. 21A and 21B, if a vertical line and a horizontal line meet each other at bottom left, it is highly possible to be a graph. Furthermore, the following conditions raise the probability of the graph: these vertical and horizontal lings have arrows at their end opposite to the crossing point; there are black pixels which indicate some characters near the crossing point; there are black pixels which indicate some words or characters under the horizontal line or left to the vertical line; or there are short lines indicating divisions at a fixed interval on these lines.

When there are three parallel horizontal lines and when the horizontal coordinate of both ends of these lines are equal as shown in FIGS. 19C end 19D, this is probably a table.

There is more probability of being a table when there are two vertical lines each crossing the end of each horizontal line or when there is a vertical line running the center of each horizontal line or consecutive white pixels running vertically.

As shown in FIGS. 21E and 21F, when a diamond has lines each extending from its apex, it may be a flowchart. If these lines are connected with other diamonds or rectangles, there is higher possibility of being a flowchart.

When several rectangles are interconnected with straight lines or arrows, it may be a block diagram. If the straight lines are not parallel in vertical or horizontal directions, there is higher possibility of being a block diagram.

When the aspect ratio of a rectangle is 1.5:1 or smaller than 1, it may be a photograph or drawn picture. If the ratio is 2:1 or greater than 1, there is more probability of being a drawn picture.

As shown in FIG. 21G, an upright oval comparatively smaller as compared with the entire page may be a portrait, which is often contained in documents generated more than 30 years ago.

A circle may be a pie chart.

Ovals and circles can be easily found from white pixels whose widths change discontinuously.

Thus, without recognizing characters of inputted dot data, drawings can be roughly classified into graphs, tables, flowcharts, photographs, drawn pictures, portraits, and pie charts.

In addition, it is possible to use control signals such as start-of-page signals and start-of-line signals to recognize the sizes or drawings compared to the entire page and their positions, based on the size and position of a square composed of black pixels, thereby using them as visual features relevant to attribute information.

The following is a description on features of the form.

The number of lines included in a page, and the number of characters included in a line, as well as the size and number of paper are roughly determined depending on their types such as newspaper and patent applications in each country or language.

Taking a Japanese business newspaper as an example, its size is about 54 cm by 41 cm. Excluding advertizement and head lines, one page is horizontally divided into 15 columns each of which includes about 14 characters written vertically and 87 lines in the horizontal direction. Morning paper has 30–45 pages except for sundays, and evening paper has 8–12 pages.

Except for a full-page aavertizement, advertizements are usually on the bottom of the pages and portraits are shown in a 3 cm by 3 cm square.

For the case of Japanese patent publications, each page is A4 size and 29 lines in the horizontal direction and each line has 36 characters.

These are also true in the case of U.S.P., PCT, newspapers, and the like, For example, U.S.P. is A4 size, each page is divided into right and left columns. Each column has 68 lines and each line has about 50 characters, or 9 words.

For the case of dictionaries, each entry is shown bold and each page is divided into 2 or 3 columns in most cases.

Unlike printed documents, those written with a word processor or a typewriter have enough margin. Depending on the type of document, the size of each page, the number of pages, the presence or absence of drawings or pictures, their form of description are mostly determined.

Most brochures are A4 size, spread, and have about 20 pages or less with many pictures.

Brochures for products have more pages, and small squares indicating a large number of products are shown there.

Paperbacks, science magazines such as NATURE, weekly magazines, monthly magazines, and military magazines such as AVIATION WEEK have their own size and number of pages roughly predetermined.

B4-size or larger books, especially A3-size or larger ones may be illustrated reference books for animals and plants, maps, photograph collections, or the like.

If one-page document contains drawings, it may be a plan or a poster.

Books on hobbies such as tropical fish, cooking, multimedia, space rockets or printers of various arts contain half-page or full-page drawings in most cases. Many such books contain words in right columns only.

U.S.P. contain pages including only drawings followed by pages for a specification.

In patent publications or academic magazines, each invention and thesis always start from the top of a new page. In patent publications, a page containing a title of an invention has a bar code and a horizontal line in the upper part of the page. In academic magazines, the name of each speaker is put lower right to each title and there is no description around each title. The main part of a thesis and its title can be distinguished from each other by the horizontal line or horizontal character strings.

For the case of plans, their titles are put in the bottom center, bottom right, or top right.

These features can be found from the arrangement and size of white and black pixels of inputted document data, and especially from white and black pixels arranged in straight lines. It sometimes necessary to know whether the straight lines cross each other, they are arrows or not, broken lines or full lines, and the like; however, it is unnecessary to identify each character or word.

It is possible to recognize the positions of drawings in a page or to know the number of pages, based on end-of-line signals and end-of-page signals which are generated when they are read by an L/E converter.

The number of drawings contained in a page can be easily known because most drawings are square or enclosed by a square, or there are consecutive white pixels or lines between different drawings.

Therefore, the drawing feature database unit 311 stores visual features produced based on the arrangement of consecutive white pixels or black pixels, and especially those arranged in a straight line and document types as attribute values of each document.

The drawing feature recognition unit 310 extracts from inputted document data features on the arrangement of consecutive white and black pixels, determines the size of pages, and the presence or absence of arrows at the end of the straight lines, and outputs an appropriate attribute value, by referring to the drawing feature database unit 311.

The form recognition unit 312 outputs the form and type of a document as an attribute value. Therefore, if a user remember the type or form of his/her desired document, it is possible to narrow candidate data by inputting it as an attribute value.

Figure 22:
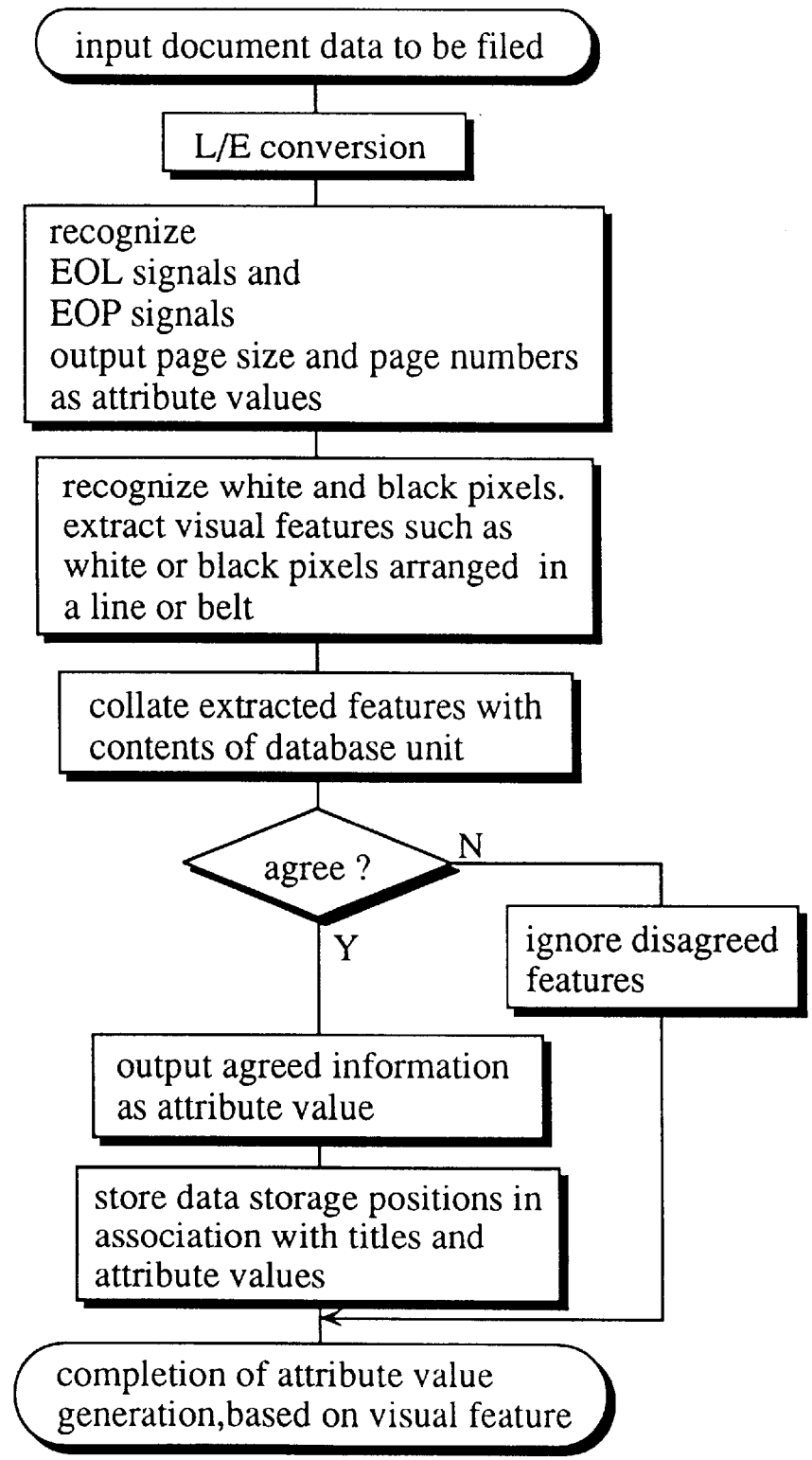
FIG. 22 shows a flowchart depicting an attribute value generation in the fifth embodiment.

FIG. 22 shows the procedure of generating attribute values.

Figure 23:
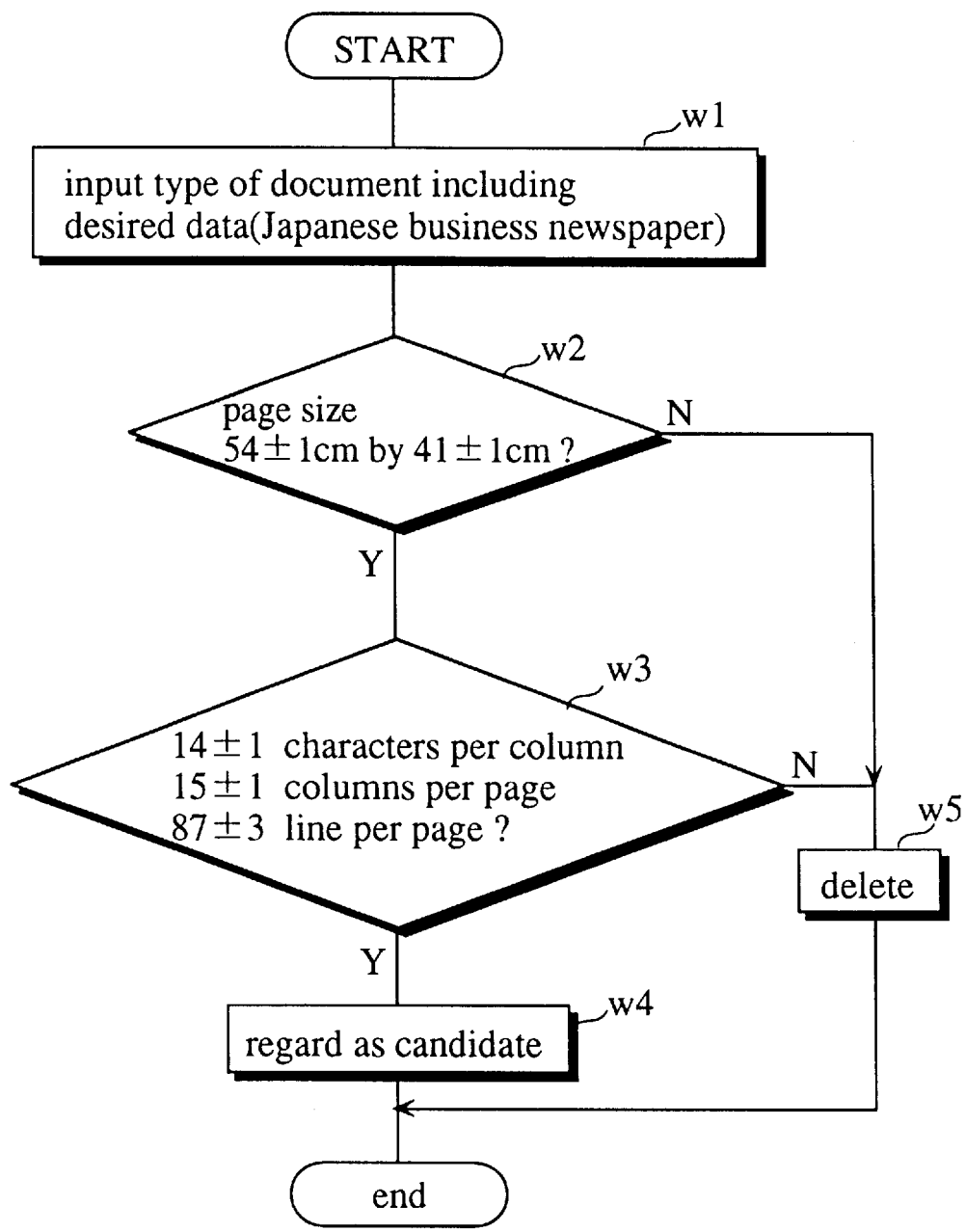
FIG. 23 shows the procedure of retrieving desired data from newspapers.

FIG. 23 shows the procedure of retrieving desired data.

A user inputs the type of the document which include a desired data. For example, he inputs a Japanese business newspaper (w1). The retrieving device determines whether the size of pages of the filed documents meets that of the newspaper (w2). For this case, errors up to 1 cm in horizontal and vertical directions are ignored because L/E conversion often produces such errors.

When the size of pages of the filed documents meets that of the newspaper, the number of columns in a page, the number of characters and lines in a column of the filed document are compared with those of the newspaper (w3). For this case, exceptions such as reading errors or advertizement are taken into account, Documents which are judged to meet the requirements in the steps (w2) and (w3) are selected (w4). Those documents which do not meet either requirement are deleted (w5).

Thus, his information that it was included in a Japanese newspaper is effectively used to retrieve the user's desired data.

On the other hand, if a user remember that what he is trying to retrieve is a book with 13 cm long, 18 cm wide, 1 cm thick, few drawings, and its pages are not divided into right and left columns and there are large number of lines in each page, it is possible to exclude newspapers, patent publication, and hardcovers from candidates and to narrow into paperback, by using his memory as a clue.

A function of displaying the number of lines per page and the number of characters per line of frequently retrieved U.S.P or newspapers as reference when attribute values related to visual features are inputted may be added.

Some newspapers have color pages these days. The colors may be attribute values.

The presence of a picture occupying over one-fourth of the entire page or a large headline.

These visual features may be obtained from other people than users.

<Embodiment 7>

The present embodiment relates to making use of display units of currently unused apparatuses for retrieval.

Generally, when a document is being generated with a word processor, other documents are often referred to. To display the document to be referred to on the screen of the word processor is accompanied by a troublesome switching operation. It is further troublesome to display both the document which is being generated and the reference document on the same screen to compare them, or to keep generating the document while referring to the reference document. The multi-window system has resolved this problem to some extent, but that is not enough, especially for the case of notebook computers with a small display.

In most households and offices, there are apparatuses whose display units are available. For example, a person who is generating a document with a notebook computer at home may have a TV set available. He may also use another notebook computer which is not occupied by anyone at present in his office.

The present embodiment is directed to make good use of the display unit of such available apparatus.

Figure 24A:
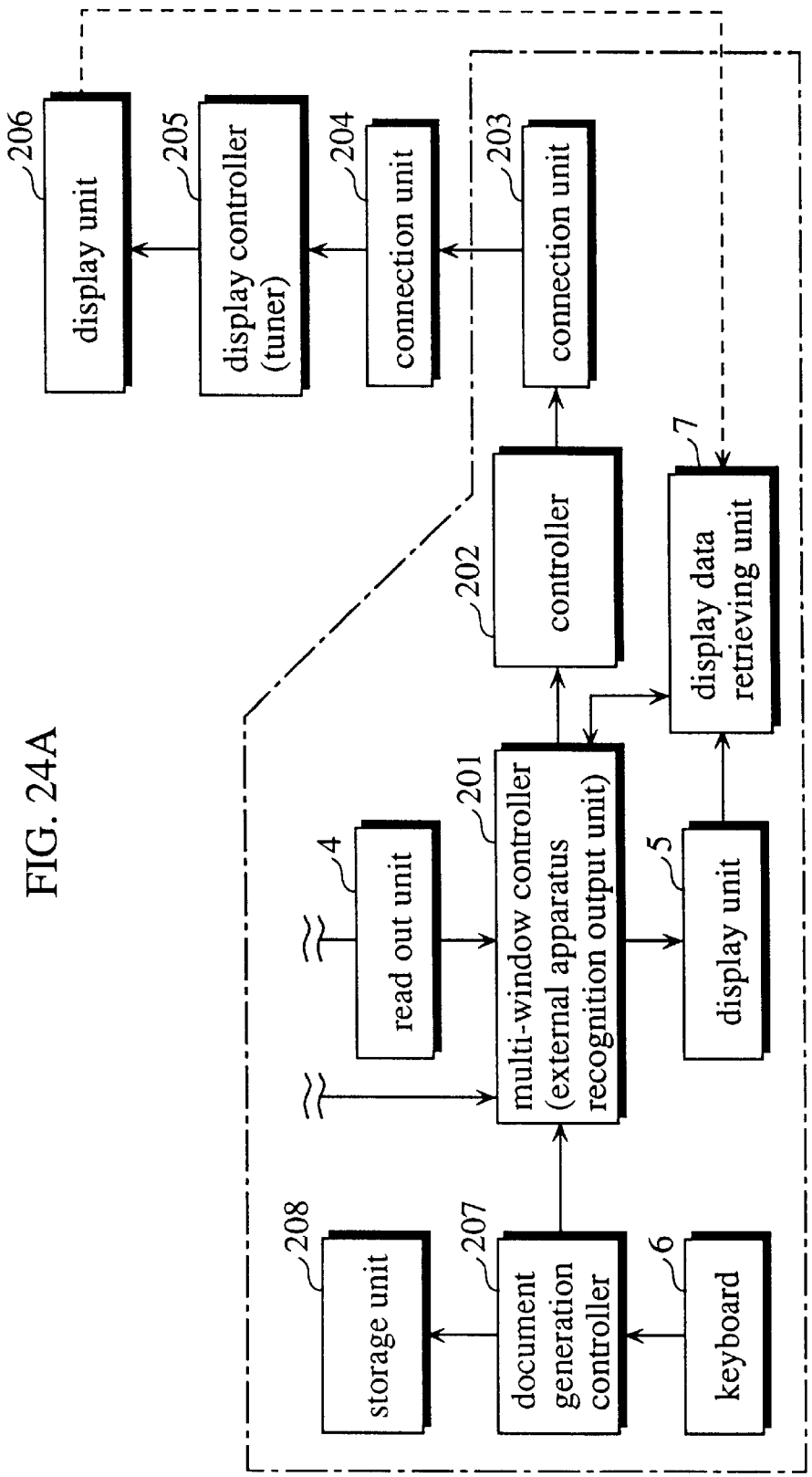
FIG. 24A shows the construction of the main part of the fifth embodiment and FIG. 24B shows the outward appearance thereof.
Figure 24B:
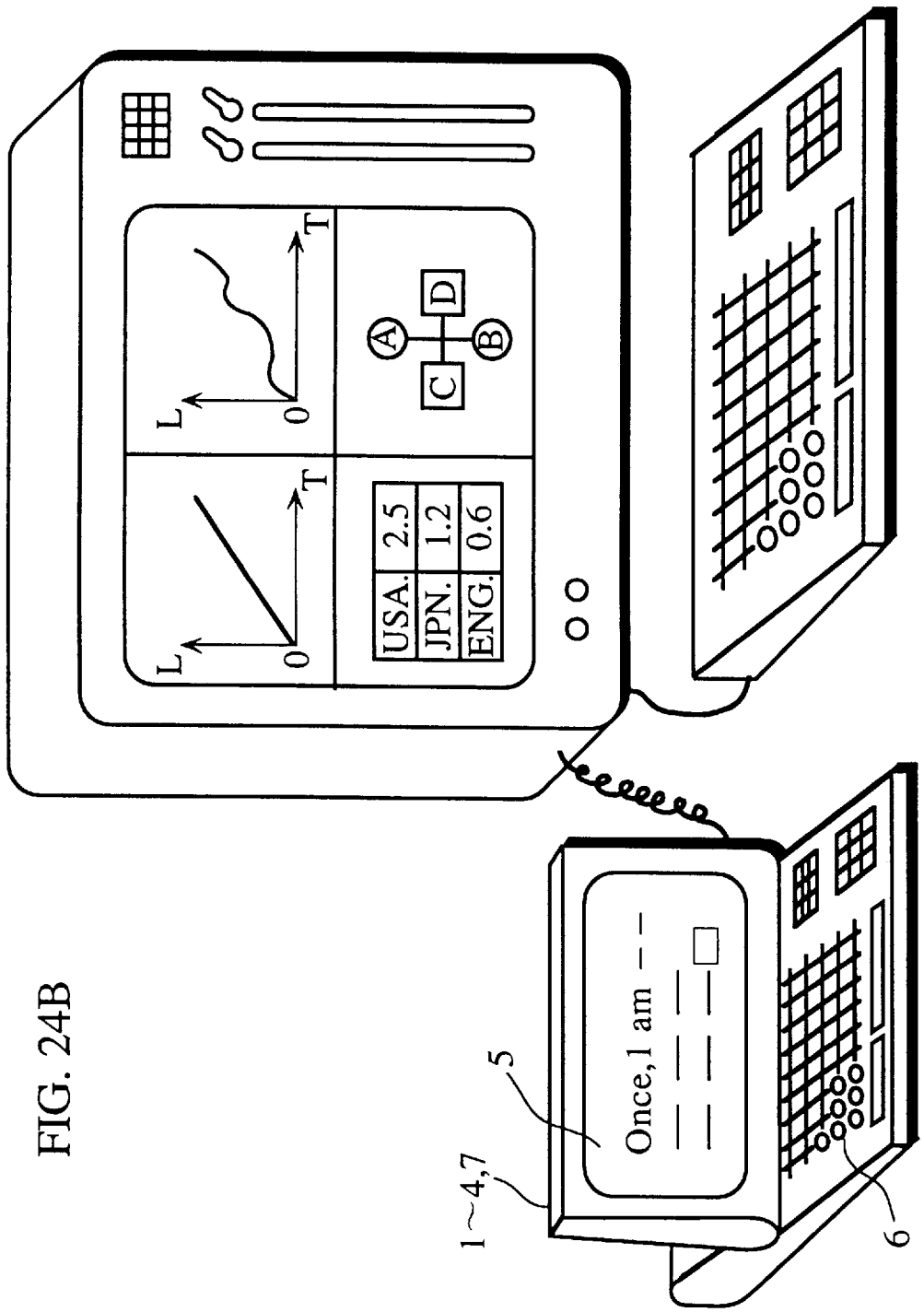

FIG. 24A shows the construction of the main part of the present embodiment and FIG. 24B shows the outward appearance thereof. Those drawings correspond to FIG. 3A and FIG. 3B, respectively of the first embodiment. The notebook computer provided with the document filing apparatus of the present embodiment is enclosed with a dashed line, and the remaining parts represent a word processor whose display unit is borrowed for data reference. In FIG. 24A, the data storage unit, the attribute value designation unit, and the like are omitted because they are not directly related to the present embodiment.

The following is a description on the notebook computer provided with the document filing apparatus of the present embodiment. The like components are labeled with like reference numerals with respect to the first embodiment shown in FIGS. 3A and 3B, and the description of these components is not repeated.

FIG. 24A shows a multi-window controller 201, a converter 202, connection units 203 and 204 each composed of a connecter and lines, a display controller 205 of the word processor, a display unit 206 of the word processor, a document generation controller 207 of the notebook computer, and a storage unit 208 for storing a document in process. The document generation controller 207 and the storage unit 208 are the same as those provided in traditional notebook computers. Therefore, users generates a documents by operating the keyboard 6 while watching the document displayed on the display unit 5 made of liquid crystal.

Under control of the document generation controller 207, characters and words inputted through the keyboard 6 are displayed on a predetermined position on the display unit 5, stored in the storage unit 208 at the same time, and outputted to an unillustrated disk.

The multi-window controller 201 is used when a user who is generating a document, want to retrieve another document for reference, while leaving the current document as it is.

In conventional multi-window system, the document for reference is displayed on the same screen as the current document by occupying part of the screen. However, the multi-window controller 201 of the present embodiment has an external apparatus recognition output unit which excludes other windows than the currently used one. The external apparatus recognition output unit outputs data to be displayed by other windows to the converter 202. The converter 202 performs necessary amendment to connect the notebook computer with the word processor, concerning the current of image signals, frequencies, display sizes or the like. When they have the display units of the same type and the same standards, no amendment is necessary. The fact is that no or miner amendment is necessary. The amended data are outputted to the display controller 205 of the word processor via the connection units 203 and 204, and further outputted to the display unit 206.

When the display controller 205 is provided to a TV set, it has a tuner adjuster to choose a predetermined channel and does not make the display unit 206 display data which have been outputted from its own memory or received through antenna.

Consequently, the display data retrieving unit 7 makes candidate data to be retrieved be displayed on the display unit 206. After finding desired data from the candidate data, the user operates the keyboard 6 to display desired data. Then, the desired data are read out and displayed on the display unit 206. The user keeps on generating the current document while referring to the display.

Figure 25:
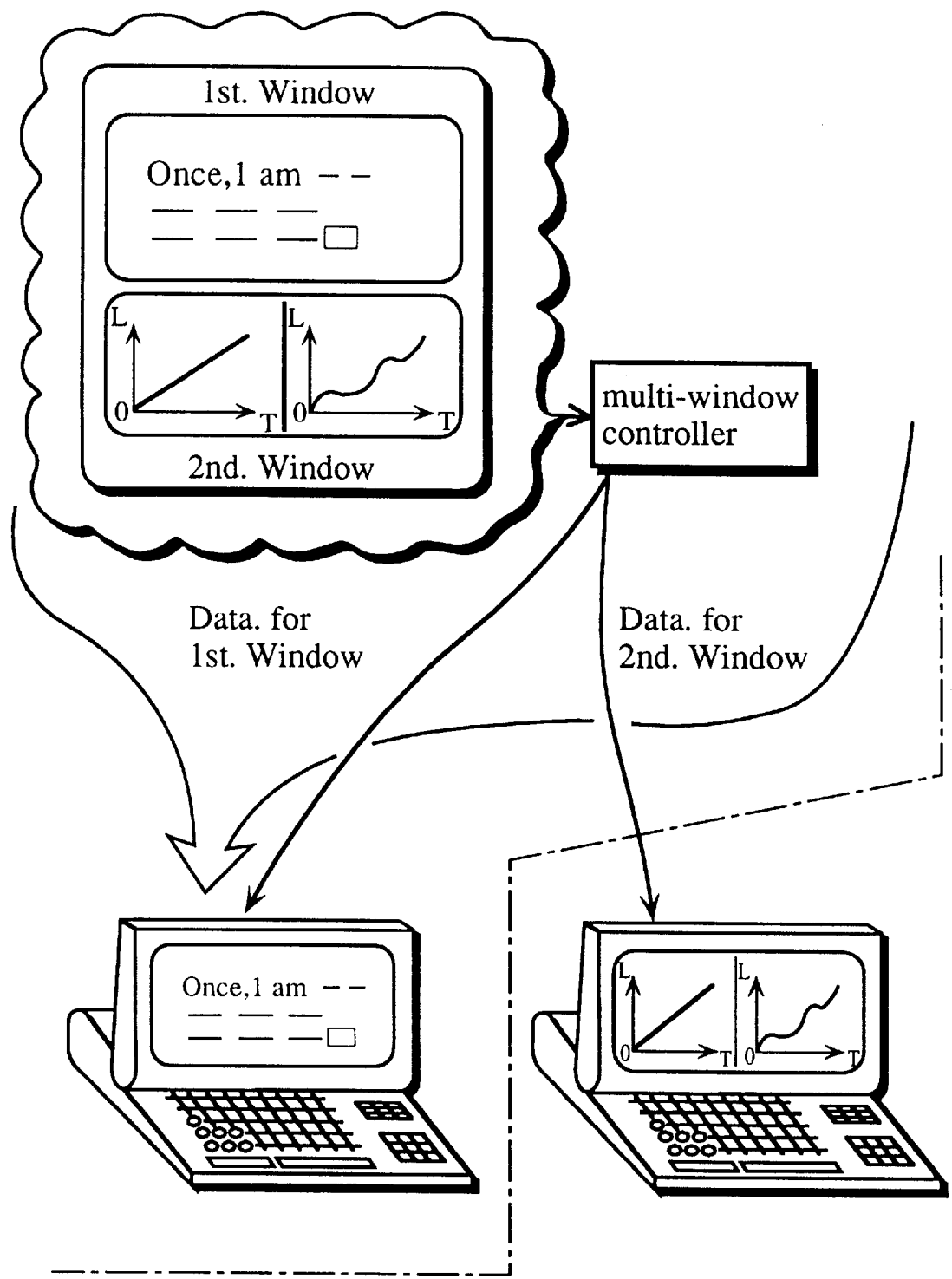
FIG. 25 shows the concept of the multi-window process in the case where the display unit of the same notebook computer as that of the fifth embodiment is used to display candidate data to be retrieved and to display desired data.

FIG. 25 shows the case where the display unit of the same notebook computer as that of the present embodiment is used to display candidate data to be retrieved and to display desired data found out from the candidate data under control of the multi-window controller 201.

The multi-window controller 201 reads the desired data out and outputs them to the display unit of the other notebook computer. Since the two notebook computers are of the same type, no complicated adjustment is necessary concerning the voltage or current of signals to display data. This can be true to the case of notebook computers of the same standard.

A detachable display unit may be attached to a notebook computer in order to keep its portability. In this case, the display control unit including the multi-window controller is designed to deal with a doubled display area and only the upper half of the area is used. When the detachable display unit is attached, a signal sent from the connection unit 203 to indicate the attachment is detected to exert the multi-window, and data for the lower half area is sent to the detachable display unit.

The following are included in the present invention.
(1) A conventional detection unit is also used. More specifically,
   a) As retrieval keys, date on which a document data is inputted or generated or another key word, or the name of a person who generated or inputted the document data can be also used.
   b) In document data containing only characters, instead of sequentially displaying the retrieved document data themselves, only the titles of these document data can be displayed, and the user can designate a desired one.
   c) A plurality of attribute values can be designated so that only the document data relevant to all the attribute values may be detected.
(2) Another function can be provided for treating each of a number of pages contained in a document data as if it were an individual document data. In this case, each page is recognized by identifying end-of-page signals or another special symbol to indicate pages. For example, the pages of document data, which are usually indicated in the center of the bottom line or the right end of the top line, are recognized by checking electronically.
(3) Another function can be provided for adding attribute values for image data, depending on the presence or absence of colors and adding attribute values for character data, depending on the presence or absence of special words or symbols. The presence or absence of colors in image data can be judged by checking dot data of each pixel. When data is inputted by L/E conversion, the presence or absence of colors is judged during the L/E conversion.
(4) image da generated by the image data generation unit are mostly small because they are part of document data. Therefore, another function can be provided for displaying automatically enlarged image data in accordance with the user's selection or by automatically detection the small image data.

This function is realized easily by judging the size of image data from absolute value of the difference between top and bottom ends and right and left ends after detecting horizontal lines which are above or under character data or pages.
(5) A component of the present invention can be physically divided into a plurality of units for the convenience of production. Some components con be combined or united into a single component.
(6) The number and display speed of data displayed by the display unit can be adjusted by the direction of the user.
(7) The title and creation data of document data are also displayed by the direction of the user.
(8) When document data is sequentially displayed, titles of document data can be displayed not in the order they have been created but in a Japanese alphabetical order or the Roman alphabetical order.
(9) In the fifth embodiment, when a high-level computer system is available in a newspaper publishing company or library, attribute such as language shown in the fourth embodiment can be judged by reading rather complicated character data including hand-written characters inputted through L/E conversion.
(10) To recognize character data inputted through L/E conversion, a method based on a decision tree can be employed instead of a method using template. Since the entire number of Kanji is very large, they are not treated as the subject of recognition.
(11) When a plurality of attribute values are designated, the user is notified if there are document data which are relevant to most of the attribute values by an additionally provided function, thereby avoiding operational errors of the user.

(12) The combination of the technology or principle of each embodiment.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A document filing apparatus for retrieving desired document data stored therein, based on an attribute value indicating visual features of the desired document data, comprising:

a document data reception means for receiving document data in a form of dot data;

a pixel line/belt detection means for detecting black pixels or white pixels in a form of a line or a belt from received document data;

a character string/drawing extract means for extracting lines and rows of character string data and drawings from horizontal and vertical arrangement of the black pixels or white pixels detected by said pixel line/belt detection means;

an average-size character extract means for extracting average-size characters from spaces between the characters and one of the lines of the character string data and the rows of character string data extracted by said character string/drawing extract means;

a drawing attribute value dictionary for previously registering at least one of following attribute values:
a size of pages,
shape of the pages,
whether characters are written vertically or horizontally,
number of columns, number of characters per column, and number of rows per page in a case where characters are written vertically,
whether each page is divided into right and left columns, number of lines per page and number of characters per line in a case where characters are written horizontally,
whether a document is printed or generated with a word processor or typewriter,
a presence or absence of characters larger than the average-size characters,
a presence or absence of characters smaller than the average-size characters,
a presence or absence of drawings,
a presence or absence of graphs,
a presence or absence of tables,
a presence or absence of flowcharts,
a presence or absence of structural illustration,
a presence or absence of oval portraits,
number of drawings,
size of drawings,
position of drawings, and
a presence or absence of colors, a visual feature attribute value dictionary for previously registering at least one of following attribute values:
number of columns per page in a case where characters are written vertically,
number of characters per column and number of rows per page in a case where characters are written vertically,
whether each page is divided into right and left columns in a case where characters are written horizontally, and
average number of characters per line and average number of lines per page in a case where characters are written horizontally, a document data type dictionary for previously registering a type of each document data as an attribute value, the type being determined by visual features including drawings and document styles;

an attribute value generation means for generating attribute values indicating visual features of document data based on the lines and rows of character string data and drawings extracted by said character string/drawing extract means and based on the average-size characters extracted by said average-size character extract means, by referring to said drawing attribute value dictionary, said visual feature attribute value dictionary, and said document data type dictionary;

a document data storage means for receiving the attribute value from said attribute value generation means and storing each document data in association with a corresponding one of the attribute values as a retrieval key;

an attribute value designation means for making an operator designate an attribute value indicating visual features of document data to be retrieved as a retrieval key;

a readout means for reading the document data corresponding to the attribute value designated by said attribute value designation means;

a display means for sequentially displaying document data read by said readout means, based on the operator's memory of visual features of the document data; and a selecting means for selecting document data to be retrieved from among candidate document data displayed by said display means according to the operator's direction.

2. The apparatus of claim 1, wherein said attribute value generation means comprises;

a few-stroke character detection means for detecting a presence or absence of a character with few strokes from the average-size characters extracted by said average-size character extract means; and a character type generation means for determining a type of a few-stroke character detected by said few-stroke character detection means and for outputting the type as an attribute value of the document data.

3. The apparatus of claim further comprising a content attribute value dictionary means for registering 20 or less words consisting of few-stroke characters and being frequently used in association with data to be used for judging attribute values, the words indicating at least one of a language, age, and field of the document data, wherein said attribute value generation means comprises:
a word extract unit for extracting a word consisting of few-stroke characters from few-stroke characters detected by said few-stroke character detection means;
an input data attribute value generation unit for checking whether the word extracted by said word extract unit is already registered in said content attribute value dictionary meant, and if the word is registered, outputting an attribute value which indicates the document data, based on said data to be used for judging attribute values registered in association with the word.

4. The apparatus of claim 3, wherein
said document data reception means includes an input operation reception unit for receiving operator's input operation to generate document data, and further comprising:

a data display control means for making said display means display document data in replace of the candidate document data, the document data are being received by said input operation reception unit;

a multi-window control means for generating an extra display window in addition to a display window for current document data displayed on said display means, and displaying one of the candidate document data read by said readout means and the part of the document data containing any visual feature on the extra display window of an external apparatus;

a data conversion/connection means for converting necessary signal forms and connecting signal lines to make one of a plurality of windows which are to be displayed under control of said multi-window control means be displayed on the extra display window of the external apparatus; and an extra display window control means for making said selecting means select document data to be retrieved from among the candidate document data displayed on the extra display window according to the operator's direction and making selected document data be displayed on the extra display window.

5. The apparatus of claim 4, wherein said attribute value generation means comprises:

an input data attribute value generation unit for making said attribute value generation means generate attribute values for document data received by said input operation reception unit; and an attribute value extract means for extracting an appropriate attribute value indicating visual features of the received document data through the operator's direction and outputting an extracted attribute value;

said document data storage means comprises:

a storage media placement means for storing the received document data in storage media which are detachable from the document filing apparatus; and a storage media data storage means for storing first information to designate a storage medium having desired document data and second information to identify each storage medium, in association with an attribute value indicating visual features of each document data outputted under direction of said input data attribute value generation unit and said attribute value extract means;

said attribute value designation means comprises a storage media attribute value designation unit for making an operator designate an attribute value as a retrieval key, the attribute value being stored in said storage media data storage means;

said readout means comprises a storage media readout unit for rending one of a storage medium which has document data corresponding to the attribute value designated by said storage media attribute value designation unit and the second information from said storage media data storage means.

6. The apparatus of claim 5 further comprising a document data simultaneous display operation means for making an operator select documents to be displayed simultaneously when a plurality of candidate documents are read by said readout means.

7. The apparatus of claim 6, wherein said attribute value generation means further comprises a non-character data output unit for outputting attribute values identifying non-character data included within a document for at least one of each page in the document and the entire document.

8. The apparatus of claim 4 further comprising a document date simultaneous display operation means for making an operator select documents to be displayed simultaneously when a plurality of candidate documents are read by said readout means.

9. The apparatus of claim 8, wherein said attribute value generation means further comprises a non-character data output unit for outputting attribute values identifying non-character data included within a document for at least one of each page in the document and the entire document.

10. The apparatus of claim 4, wherein said attribute value generation means further comprises a non-character data output unit for outputting attribute values identifying non-character data included within a document for at least one of each page in the document and the entire document.

11. The apparatus of claim 1 further comprising a document data simultaneous display operation means for making an operator select documents to be displayed simultaneously when a plurality of candidate documents are read by said readout means.

12. The apparatus of claim 11, wherein said attribute value generation means further comprises a non-character data output unit for outputting attribute values identifying non-character data included within a document for at least one of each page in the document and the entire document.

* * * * *